(12) United States Patent
Suh et al.

(10) Patent No.: US 8,823,773 B2
(45) Date of Patent: Sep. 2, 2014

(54) METHOD AND APPARATUS FOR PROCESSING AND RECEIVING DIGITAL BROADCAST SIGNAL FOR 3-DIMENSIONAL DISPLAY

(75) Inventors: Jongyeul Suh, Seoul (KR); Jeehyun Choe, Seoul (KR); Joonhui Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 311 days.

(21) Appl. No.: 13/222,752

(22) Filed: Aug. 31, 2011

(65) Prior Publication Data

US 2012/0050473 A1 Mar. 1, 2012

Related U.S. Application Data

(60) Provisional application No. 61/379,378, filed on Sep. 1, 2010.

(51) Int. Cl.
*H04N 13/00* (2006.01)
(52) U.S. Cl.
USPC .............................. 348/43; 348/58; 345/419
(58) Field of Classification Search
USPC ...................................................... 348/42–60
See application file for complete search history.

(56) References Cited

U.S. PATENT DOCUMENTS

| | | | |
|---|---|---|---|
| 2006/0125962 A1 | 6/2006 | Shelton et al. | |
| 2009/0096863 A1 | 4/2009 | Kim et al. | |
| 2009/0142041 A1* | 6/2009 | Nagasawa et al. | 348/42 |
| 2009/0295790 A1* | 12/2009 | Pockett | 345/419 |
| 2010/0134603 A1* | 6/2010 | Itoh | 348/58 |

FOREIGN PATENT DOCUMENTS

| | | |
|---|---|---|
| KR | 10-2006-0134309 A | 12/2006 |
| KR | 10-2007-0055882 A | 5/2007 |
| WO | WO 2008/038205 | 4/2008 |
| WO | WO 2008/139351 | 11/2008 |
| WO | WO 2010/064853 | 6/2010 |

OTHER PUBLICATIONS

ATSC A/69 (2009): "ATSC Recommended Practice: Program and System Information Protocol Implementation Guidelines for Broadcasters", Dec. 25, 2009.*
ETSI EN 300 468 V1.9.1, "Digital Video Broadcasting (DVB); Specification for Service Information (SI) in DVB Systems", Mar. 2009, XP014043728.

* cited by examiner

*Primary Examiner* — Dave Czekaj
*Assistant Examiner* — Shanika Brumfield
(74) *Attorney, Agent, or Firm* — McKenna Long & Aldridge LLP

(57) ABSTRACT

The disclosed method for processing a digital broadcast signal for a 3-dimentional, 3D, service comprises encoding video data for the 3D service into a video stream, the video data comprising a left picture and a right picture for a 3D image, generating the broadcast signal having the video data and service information for the 3D service, the service information including video depth range descriptor indicating a minimum disparity and a maximum disparity that occur during a given time window of the video stream, wherein the minimum disparity and the maximum disparity are a minimum difference and a maximum difference between horizontal positions of a pixel representing a same point in space in the left and right views of 3-dimentional image, respectively, and transmitting the digital broadcast signal for the 3D service.

9 Claims, 29 Drawing Sheets

| Syntax | No. of bits | Format |
|---|---|---|
| 3D_Depth_Info_descriptor ( ) { | | |
| descriptor_tag | 8 | 0xTBD |
| descriptor_length | 8 | uimsbf |
| min_disparity | 16 | tcimsbf |
| max_disparity | 16 | tcimsbf |
| } | | |

FIG. 1

| Syntax | No. of bits | Format |
|---|---|---|
| 3D_Depth_Info_descriptor ( ) { | | |
| descriptor_tag | 8 | 0xTBD |
| descriptor_length | 8 | uimsbf |
| min_disparity | 16 | tcimsbf |
| max_disparity | 16 | tcimsbf |
| } | | |

FIG. 2

| Syntax | No. of bits | Mnemonic |
|---|---|---|
| 3D_Scene_Depth_Info_descriptor ( ) { | | |
| descriptor_tag | 8 | 0xTBD |
| descriptor_length | 8 | uimsbf |
| reserved | 1 | bslbf |
| scene_format_type | 2 | bslbf |
| first_scene_start_time | 5 | uimsbf |
| number_of_scenes | 8 | uimsbf |
| if (scene_format_type="10") { | | |
| scene_duration | 16 | uimsbf |
| for (i = 0; I < number_of_scenes; i++) { | | |
| scene_id | 8 | uimsbf |
| min_disparity | 16 | tcimsbf |
| max_disparity | 16 | tcimsbf |
| } | | |
| } | | |
| else if (scene_format_type="11") { | | |
| for (i = 0; I < number_of_scenes; i++) { | | |
| scene_id | 8 | uimsbf |
| scene_start_time | 16 | uimsbf |
| scene_duration | 16 | uimsbf |
| min_disparity | 16 | tcimsbf |
| max_disparity | 16 | tcimsbf |
| } | | |
| } | | |
| } | | |

FIG. 3

| Value | Description |
|---|---|
| '00' ~ '01' | Reserved |
| '10' | Scene is defined by constant length video segment, its length is defined by scene_duration |
| '11' | Each scene has a variable duration and defined by scene_start_time and scene_duration |

FIG. 5

| Syntax | No. of bits | Mnemonics |
|---|---|---|
| 3D_scene_depth_information ( ) { | | |
|     sync_byte | 8 | bslbf |
|     segment_type | 8 | bslbf |
|     reserved | 1 | bslbf |
|     scene_data_type | 2 | bslbf |
|     first_scene_start_time | 5 | uimsbf |
|     number_of_scenes | 8 | uimsbf |
|     if (scene_data_type="01") { | | |
|         for (i = 0; i < number_of_scenes; i++) { | | |
|             reserved | 2 | bslbf |
|             target_event_id | 14 | uimsbf |
|             min_disparity | 16 | tcimsbf |
|             max_disparity | 16 | tcimsbf |
|         } | | |
|     } | | |
|     else if (scene_data_type="10") { | | |
|         scene_duration | 16 | uimsbf |
|         for (i = 0; i < number_of_scenes; i++) { | | |
|             scene_id | 8 | uimsbf |
|             min_disparity | 16 | tcimsbf |
|             max_disparity | 16 | tcimsbf |
|         } | | |
|     } | | |
|     else if (scene_data_type="11") { | | |
|         for (i = 0; i < number_of_scenes; i++) { | | |
|             scene_id | 8 | uimsbf |
|             scene_start_time | 16 | uimsbf |
|             scene_duration | 16 | uimsbf |
|             min_disparity | 16 | tcimsbf |
|             max_disparity | 16 | tcimsbf |
|         } | | |
|     } | | |
| } | | |

FIG. 6

| Syntax | No. of bits | Format |
|---|---|---|
| 3D_Depth_Range_descriptor ( ) { | | |
|     descriptor_tag | 8 | 0xTBD |
|     descriptor_length | 8 | uimsbf |
|     3D_scene_depth_info_version | 32 | uimsbf |
|     first_scene_start_time | 32 | uimsbf |
|     last_scene_end_time | 32 | uimsbf |
| } | | |

FIG. 7

| Syntax | No. of bits | Format |
|---|---|---|
| 3D_Depth_Range_descriptor ( ) { | | |
| descriptor_tag | 8 | 0xTBD |
| descriptor_length | 8 | uimsbf |
| reserved | 3 | bslbf |
| 3D_scene_depth_info_PID | 13 | uimsbf |
| 3D_scene_depth_info_version | 32 | uimsbf |
| first_scene_start_time | 32 | uimsbf |
| last_scene_end_time | 32 | uimsbf |
| } | | |

FIG. 8

| Syntax | Bits | Identifier |
|---|---|---|
| component_descriptor( ){ | | |
|     descriptor_tag | 8 | uimsbf |
|     descriptor_length | 8 | uimsbf |
|     resrved_future_use | 4 | Bslbf |
|     stream_content | 4 | uimsbf |
|     component_type | 8 | uimsbf |
|     component_tag | 8 | uimsbf |
|     ISO 639-2 [3]_language_code | 24 | Bslbf |
|     for (i=0;<N;i + +){ | | |
|         text_char | 8 | uimsbf |
|     } | | |
| } | | |

FIG. 9

| Stream_content | Component_type | Description |
|---|---|---|
| 0x09 | 0x00 | Reserved for future use |
| 0x09 | 0x01 | 3D Scene Depth Information |

FIG. 10

| Syntax | No. of bits | Mnemonic |
|---|---|---|
| TS_program_map_section( ) { | | |
|   table_id | 8 | uimsbf |
|   section_syntax_indicator | 1 | Bslbf |
|   '0' | 1 | Bslbf |
|   reserved | 2 | Bslbf |
|   section_length | 12 | uimsbf |
|   program_number | 16 | uimsbf |
|   reserved | 2 | Bslbf |
|   version_number | 5 | uimsbf |
|   current_next_indicator | 1 | Bslbf |
|   section_number | 8 | uimsbf |
|   last_section_number | 8 | uimsbf |
|   reserved | 3 | Bslbf |
|   program_info_length | 13 | uimsbf |
|   for (i=0; i < N; i ++) { | 4 | Bslbf |
|     descriptor() | 12 | uimsbf |
|   } | | |
|   for (i=0; i < N1; i ++) { | | |
|     stream_type | 8 | uimsbf |
|     reserved | 3 | Bslbf |
|     elementary_PID | 13 | uimsbf |
|     reserved | 4 | Bslbf |
|     ES_info_length | 12 | uimsbf |
|     for (i = 0; i < N2; i++) { | | |
|       descriptor() | | |
|     } | | |
|   } | | |
|   CRC_32 | 32 | rpchof |
| } | | |

Possible place for 3D_depth_info_descriptor

FIG. 11

| Syntax | No. of bits | Format |
|---|---|---|
| terrestrial_virtual_channel_table_section () { | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_chnnels_in_section | 8 | uimsbf |
|   for (i=0; i<num_channels_insection; i++) { | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequncey | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for (i=0; i<N; i++) { | | |
|       descriptor() | | |
|     } | | |
|   } | | |
|   reserved | 6 | '111111' |
|   additional_descriptor_length | 10 | uimsbf |
|   for (j=0; j<N; j++) { | | |
|     additional_descriptor() | | |
|   } | | |
|   CRC_32 | 32 | rpchof |
| } | | | descriptor() → Possible place for 3D_depth_info_descriptor

FIG. 12

| Syntax | No. of bits | Format |
|---|---|---|
| event_information_table_section () { | | |
|     table_id | 8 | 0xCB |
|     section_syntax_indicator | 1 | '1' |
|     private_indicator | 1 | '1' |
|     reserved | 2 | '11' |
|     section_length | 12 | uimsbf |
|     source_id | 16 | uimsbf |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     num_events_in_section | 8 | uimsbf |
|     for (j=0; j<num_events_in_section; j++) { | | |
|         reserved | 2 | '11' |
|         event_id | 14 | uimsbf |
|         start_time | 32 | uimsbf |
|         reserved | 2 | '11' |
|         ETM_location | 2 | uimsbf |
|         length_in_seconds | 20 | uimsbf |
|         title_length | 8 | uimsbf |
|         title_text ( ) | var | |
|         reserved | 4 | '1111' |
|         descriptors_length | 12 | |
|     for (i = 0; i < N; i++) { | | |
|         descriptor() | | |
|     } | | |
|     } | | |
|     CRC_32 | 32 | rpchof |
| } | | |

Possible place for 3D_depth_info_descriptor

FIG. 13

| Syntax | No. of bits | Mnemonic |
|---|---|---|
| service_description_section ( ) { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     transport_stream_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     original_network_id | 16 | uimsbf |
|     reserved_future_use | 8 | bslbf |
|     for (i = 0; i < N; i++) { | | |
|         service_id | 16 | uimsbf |
|         reserved_future_use | 6 | bslbf |
|         EIT_schedule_flag | 1 | bslbf |
|         EIT_present_following_flag | 1 | bslbf |
|         running_status | 3 | uimsbf |
|         free_CA_mode | 1 | bslbf |
|         descriptors_loop_length | 12 | uimsbf |
|         for (j = 0; j < N; j++) { | | |
|             descriptor ( ) | | |
|         } | | |
|     } | | |
|     CRC_32 | 32 | rpchof |
| } | | |

Possible place for 3D_depth_info_descriptor

FIG. 14

| Syntax | No. of bits | Mnemonic |
|---|---|---|
| event_information_section ( ) { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     service_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     transport_stream_id | 16 | uimsbf |
|     original_network_id | 16 | uimsbf |
|     segment_last_section_number | 8 | uimsbf |
|     last_table_id | 8 | uimsbf |
|     for (i = 0; i < N; i++) { | | |
|         event_id | | |
|         start_time | 16 | uimsbf |
|         duration | 40 | bslbf |
|         runinng_status | 24 | uimsbf |
|         free_CA_mode | 3 | uimsbf |
|         descriptors_loop_length | 1 | bslbf |
|         for (i = 0; i < N; i++) { | 12 | uimsbf |
|             descriptor ( ) | | |
|         } | | |
|     } | | |
|     CRC_32 | 32 | rpchof |
| } | | |

Possible place for
3D_depth_info_descriptor

FIG. 21

```
<simpleType name="TypeOfSourceType">
        <restriction base="srting">
                <enumeration value = "HD"/>
                <enumeration value = "SD"/>
                <enumeration value = "PIP"/>
                <enumeration value = "SdBarker"/>
                <enumeration value = "HdBarker"/>
                <enumeration value = "PipBarker"/>
                <enumeration value = "3DHD"/>
                <enumeration value = "3DSD"/>
                <enumeration value="3DSceneDepthInformation"/>
        </restriction>
<simpleType>
```

FIG. 23

```
<complexType name="DepthinformationType">
        <sequence>
                    <element name="MinDisparity" type= "integer"/>
                    <element name="MaxDisparity" type= "integer"/>
        </sequence>
</complexType>
```

METHOD AND APPARATUS FOR PROCESSING AND RECEIVING DIGITAL BROADCAST SIGNAL FOR 3-DIMENSIONAL DISPLAY

This application claims the benefit of U.S. Provisional Application No. 61/379,378 filed on Sep. 1, 2010, which is hereby incorporated by reference as if fully set forth herein.

TECHNICAL FIELD

The present invention relates to a method and apparatus for efficiently providing a visual display of three dimensional (3D) images in 3D broadcasting. And, more particularly, the present invention relates to a method and apparatus for efficiently realizing an on screen display (OSD) within a broadcast receiver during a process of displaying three dimensional images in the broadcast receiver.

BACKGROUND ART

Generally, a three dimensional (3D) image (or a stereoscopic image) provides a user's eyes with a stereoscopic effect using the stereoscopic visual principle. A human being feels both near and far through a binocular parallax caused by a distance between their eyes spaced apart from each other by about 65 mm, such that the 3D image enables both right and left eyes to respectively view associated planar images, resulting in the stereoscopic effect and the perspective effect.

The above-mentioned 3D image display method may be classified into a stereoscopic scheme, a volumetric scheme, a holographic scheme, etc. In case of using the stereoscopic scheme, the 3D image display method provides a left view image to be viewed by the left eye and a right view image to be viewed by the right eye, such that the user's left eye views the left view image and the user's right eye views the right view image through either polarization glasses or a display device, resulting in recognition of the 3D image effect.

Most particularly, in order to provide three dimensional (3D) through a broadcasting environment, information for adequately displaying 3D images is required to be included in a video signal, which is transmitted through a broadcasting network or other networks.

Furthermore, the shape or display position of the OSD within the broadcast receiver is decided based upon an internal decision made by the manufacturer of the broadcast receiver. However, in case of 3D broadcasting, the three dimensional (3D) effect is either decided based upon the respective 3D broadcast service or decided by the contents provider. Therefore, while the user of the broadcast receiver is viewing a 3D broadcast program, when the user uses an OSD for adjusting the volume or screen settings of the broadcast receiver, a conflict may occur between an object included in the provided 3D image and the OSD. Generally, since a considerable amount of time is consumed when inputting broadcast screen settings by using an OSD, in case the user attempts to adjust broadcast screen settings while the 3D broadcast program is in conflict with the OSD, the user may experience intense visual fatigue.

DISCLOSURE

Technical Problem

An object of the present invention is to provide a method and apparatus for displaying 3D images that can efficiently transmit and receive information required for displaying 3D images in a broadcast receiver.

Another object of the present invention is to provide a method and apparatus for displaying 3D images that can efficiently display an OSD within a broadcast receiver during the process of viewing a 3D broadcast program.

Technical Solution

To achieve these objects and other advantages and in accordance with the purpose of the invention, as embodied and broadly described herein, A method of processing a digital broadcast signal for a 3-dimensional, 3D, service is suggested. The method comprises encoding video data for the 3D service into a video stream, the video data comprising a left picture and a right picture for a 3D image, generating the broadcast signal having the video data and service information for the 3D service, the service information including video depth range descriptor indicating a minimum disparity and a maximum disparity that occur during a given time window of the video stream, wherein the minimum disparity and the maximum disparity are a minimum difference and a maximum difference between horizontal positions of a pixel representing a same point in space in the left and right views of 3-dimensional image, respectively, and transmitting the digital broadcast signal for the 3D service.

In another aspect of the present invention, the video depth range descriptor is included in a virtual channel table (VCT), wherein the VCT includes service identification information identifying a service from any other service within a transport stream (TS), and the video depth range descriptor identifies the minimum and minimum disparity for the service identified by the service identification information.

In another aspect of the present invention, the video depth range descriptor is included in a event information table (EIT), wherein the EIT includes service identification information identifying a service from any other service within a transport stream (TS) and event identification information in identifying an event within the service identified by the service identification information, and the video depth range descriptor identifies the minimum and minimum disparity for the event identified by the event identification information.

In another aspect of the present invention, the service information further includes application selection information indicating range during which information in the video depth range descriptor is applied for the 3D service.

In another aspect of the present invention, the application selection information includes scene start time information indicating starting time of a scene included in the 3D service for application of the information in the video depth range descriptor.

In another aspect of the present invention, the application information includes scene duration information indicating duration of a scene included in the 3D service for application of the information in the video depth range descriptor.

In another aspect of the present invention, provided herein is an apparatus for receiving a digital broadcast signal for a 3-dimensional, 3D, service comprising a receiving unit configured to receive the broadcast signal having video data and service information for the 3D service, the video data being encoded for the 3D service into a video stream, the video data comprising a left picture and a right picture for a 3D image, the service information including video depth range descriptor indicating a minimum disparity and a maximum disparity that occur during a given time window of the video stream, wherein the minimum disparity and the maximum disparity are a minimum difference and a maximum difference between horizontal positions of a pixel representing a same point in space in the left and right views of 3-dimensional image, respectively, a signaling processor configured to parse the video depth range descriptor, and a decoder configured to decode the video data.

In another aspect of the present invention, the apparatus further comprises a displaying processor configured to control on screen display (OSD) menu of the apparatus to be displayed on top of the 3D image based on information in the video depth range descriptor.

In another aspect of the present invention, the signaling processor further configured to parse a virtual channel table (VCT) including service identification information identifying a service from any other service within a transport stream (TS), and the video depth range descriptor included in the VCT for identifying the minimum and minimum disparity for the service identified by the service identification information.

In another aspect of the present invention, the signaling processor further configured to parse a event information table (EIT) including service identification information identifying a service from any other service within a transport stream (TS) and event identification information in identifying an event within the service identified by the service identification information, and the video depth range descriptor included in the EIT for identifying the minimum and minimum disparity for the event identified by the event identification information.

In another aspect of the present invention, the signaling processor further configured to parse application selection information indicating range during which information in the video depth range descriptor is applied for the 3D service from the service information.

In another aspect of the present invention, the signaling processor further configured to parse scene start time information indicating starting time of a scene included in the 3D service for application of the information in the video depth range descriptor from the application selection information.

In another aspect of the present invention, the signaling processor further configured to parse scene duration information indicating duration of a scene included in the 3D service for application of the information in the video depth range descriptor from the application selection information.

In another aspect of the present invention, the displaying processor configured to control on screen display (OSD) menu of the apparatus to be displayed on top of the 3D image during the duration of the scene included in the 3D service based on information in the video depth range descriptor and the scene duration information.

Advantageous Effects

According to the embodiment of the present invention, depth information, which indicates the 3D effect intended by the manufacturer during the manufacturing process of the 3D broadcast services/contents, may be efficiently delivered to the broadcast receiver.

According to the embodiment of the present invention, in case of OSDs related to menus, graphics, other error or warning messages, even though the user is unaware of the point at which the corresponding OSD is to be displayed on the screen, or even though it is difficult to estimate for how long the OSD will be displayed on the screen, the broadcast receiver according to the present invention is designed so that conflict does not occur at a specific point between the OSDs and 3D broadcast video contents.

According to the embodiment of the present invention, even if there is a change in depth with respect to a scene change in the 3D video (or image), the user using the OSD according to the present invention may experience less visual fatigue.

DESCRIPTION OF DRAWINGS

The accompanying drawings, which are included to provide a further understanding of the invention, illustrate embodiments of the invention and together with the description serve to explain the principle of the invention.

FIG. 1 illustrates a 3D Depth Information Descriptor according to an embodiment of the present invention.

FIG. 2 illustrates a 3D Depth Information Descriptor according to another embodiment of the present invention.

FIG. 3 illustrates the significance of a scene_format_type field value according to an embodiment of the present invention.

FIG. 5 illustrates a syntax corresponding to when a 3D scene depth stream is transmitted in a PES packet format according to an embodiment of the present invention.

FIG. 6 illustrates a 3D Depth Range Descriptor according to an embodiment of the present invention.

FIG. 7 illustrates a 3D Depth Range Descriptor according to another embodiment of the present invention.

FIG. 8 illustrates a component descriptor according to an embodiment of the present invention.

FIG. 9 illustrates definitions of a stream_content field value and a component_type field value for indicating the 3D Scene Depth Information stream according to an embodiment of the present invention.

FIG. 10 illustrates a location of a PMT and locations wherein the above-described descriptors can be included within the PMT according to an embodiment of the present invention.

FIG. 11 illustrates locations wherein the TVCT and the above-described descriptors can be included according to an embodiment of the present invention.

FIG. 12 illustrates locations wherein the EIT and the above-described descriptors can be included according to an embodiment of the present invention.

FIG. 13 illustrates locations wherein the SDT and the above-described descriptors can be included according to an embodiment of the present invention.

FIG. 14 illustrates locations wherein the EIT and the above-described descriptors can be included according to an embodiment of the present invention.

FIG. 21 illustrates an extended TypeOfSourceType XML Schema for the 3D Scene Depth information according to an embodiment of the present invention.

FIG. 23 illustrates a DepthInformationType XML Schema for carrying the 3D Depth information according to an embodiment of the present invention.

BEST MODE

Figure 4:
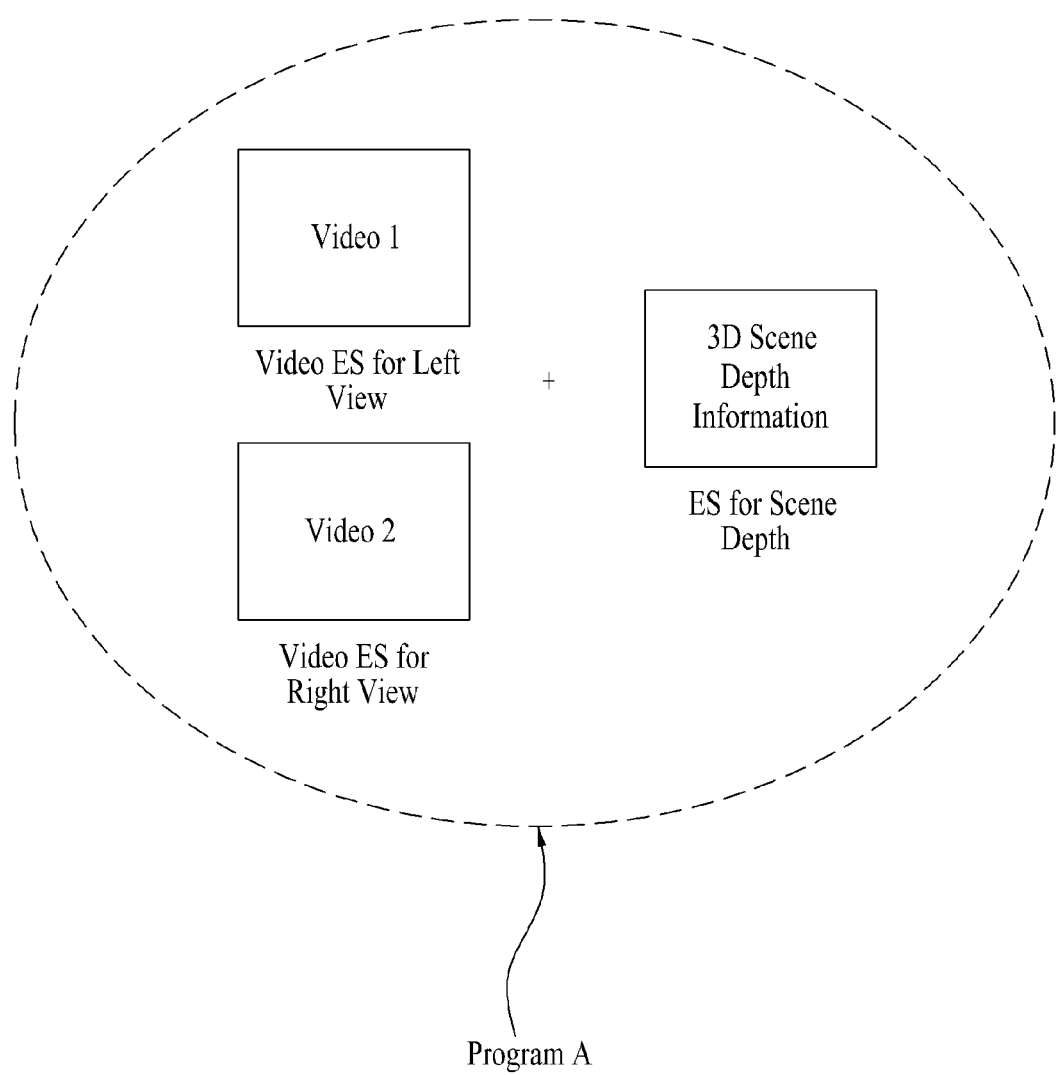
FIG. 4 illustrates a concept of 3D scene depth stream transmission based upon an Asynchronous depth information transmission method according to an embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Prior to describing the present invention, it should be noted that most terms disclosed in the present invention are defined in consideration of functions of the present invention and correspond to general terms well known in the art, and can be differently determined according to intention of those skilled in the art, usual practices, or introduction of new technologies. In some cases, a few terms have been selected by the applicant as necessary and will hereinafter be disclosed in the following description of the present invention. Therefore, it is preferable that the terms defined by the applicant be understood on the basis of their meanings in the present invention.

The 3D image display method includes a stereoscopic imaging scheme in which two view points are considered and a multi-view imaging scheme in which three or more view points are considered. In contrast, a single view image scheme shown in the related art may also be referred to as a monoscopic image scheme.

The stereoscopic imaging scheme is designed to use one pair of right and left view images acquired when a left-side camera and a right-side camera spaced apart from each other by a predetermined distance capture the same target object. The multi-view imaging scheme uses three or more images captured by three or more cameras spaced apart by a predetermined distance or angle. Although the following description discloses embodiments of the present invention using the stereoscopic imaging scheme as an example, the inventive concept of the present invention may also be applied to the multi-view imaging scheme.

A stereoscopic image or multi-view image may be compressed and coded according to a variety of methods including a Moving Picture Experts Group (MPEG) scheme, and transmitted to a destination.

For example, a stereoscopic image or a multi-view image may be compressed and coded according to the H.264/Advanced Video Coding (AVC) scheme, and transmitted. In this case, the reception system may decode a received image in reverse order of the H.264/AVC coding scheme, such that it is able to obtain the 3D image.

In addition, one of a left view image and a right view image of a stereoscopic image or one of multiple-view images may be assigned to an image of a base layer, and the remaining one may be assigned to an image of an extended layer. The base layer image may be encoded using the same method as the monoscopic imaging method. In association with the extended layer image, only information of the relationship between the base layer image and the extended layer image may be encoded and transmitted. As an exemplary compression coding scheme for the base layer image, a JPEG, an MPEG-2, an MPEG-4, or a H.264/AVC scheme may be used. For convenience of description, the H.264/AVC scheme may be exemplarily used in one embodiment of the present invention. In one embodiment of the present invention, the compression coding scheme for an image of an upper or higher layer may be set to the H.264/Multi-view Video Coding (MVC) scheme.

When the MVC scheme is additionally applied to the AVC scheme or the right/left image sequences are coded using only the AVC scheme so as to implement the stereoscopic display, one point to be duly considered when broadcasting corresponding 3D content data is compatibility with the 2D broadcast receiver of the related art. For the related broadcast receiver incapable of supporting the 3D image display, if one of right and left view images is encoded and transmitted according to a backward compatible method, the 2D broadcast receiver recognizes and outputs only the corresponding signal, such that it may be possible for a user to view the corresponding content data through the related device. In the following description, a base layer image of a time point where content data is transferred for a legacy broadcast receiver may be referred to as base view video data (or a base video), and an extended layer image transferred for displaying a 3D image may be referred to as extended view video data (or an extended video).

In the case of transferring the base view video data and the extended view video data as described above, a legacy 2D broadcast receiver receives the base video data so that it can display a 2D image, and a 3D broadcast receiver receives base view video data and extended view video data so that it can display a 3D image.

In the case of displaying 3D content, a plurality of subtitles may be displayed on a screen according to the characteristics of the 3D content or the use of a subtitle. In this case, the plurality of subtitles may have the same depth on a broadcast screen or may have different depths in order to efficiently provide a 3D effect.

For example, in the case where a plurality of actors appears and a plurality of actors simultaneously speaks their parts in 3D content, the parts are displayed as a 3D subtitle so as to provide an effect different from that of a 2D environment. That is, the depths of the subtitles representing the parts of the actors may be differently set according to the depths of the actors on one screen.

As another example, while a subtitle such as a broadcast station's logo displayed on an upper right side of a broadcast screen may be displayed at a depth closer to viewers than the depth of 3D content representing a 3D effect, the subtitle associated with the 3D content may be displayed at a depth relatively far apart from the viewers.

The term 'Subtitle' in the following description may include not only a subtitle but also displayed image, text data, graphic image, logo, etc which are additionally displayed to basic video data.

A related broadcast signal provides only basic subtitle display information. Accordingly, when a 3D broadcast receiver desires to display the basic subtitle display information, the basic subtitle display information may be represented by a 2D broadcast signal or may not be displayed. Therefore, it is necessary to transmit information capable of allowing even the subtitle display information to be displayed in a 3D format, and a broadcast receiver capable of displaying subtitle data in a 3D format using the above-mentioned information and a data processing method thereof are needed.

In the case of displaying a stereoscopic image, left view video data and right view video data are horizontally shifted by a predetermined distance so as to implement a 3D effect, and then displayed. At this time, a variety of representation values (such as a shifted distance) capable of indicating the 3D effect may be used. In accordance with the embodiment of the present invention, a disparity value will hereinafter be used as such a representation value of the 3D effect.

The 3D effect may be acquired from the process in visual perception leading to the sensation of depth from two slightly different projections of the world onto the retinas of the eyes. The difference in the two retinal images may be called horizontal disparity, retinal disparity, or binocular disparity. Hereinafter, for convenience of description and better understanding of the present invention, the difference between the two retinal images will only be referred to as 'disparity'.

The level of the 3D effect may be evaluated by the depth of the 3D image that is being displayed on the display screen. For example, based upon a plane display surface of the broadcast receiver, a 3D image having the effect of being displayed in front of the plane surface of the broadcast receiver may exist, and a 3D image having the effect of being displayed behind the plane surface of the broadcast receiver may also exist.

FIG. 1 illustrates a 3D Depth Information Descriptor according to an embodiment of the present invention.

A descriptor_tag field identifies a descriptor to which the field belongs.

A descriptor_length field indicates the length of data following the descriptor_length field in bytes, wherein the data belong to the 3D Depth Information Descriptor.

A min_disparity field indicates a minimum value of disparity that can be expressed in a 3D video that is included in a 3D service, program, or event, wherein the 3D depth information descriptor is applied. More specifically, the min_disparity field indicates a disparity value corresponding to the depth of a point that is formed at a nearest distance between the broadcast receiver and the user.

A max_disparity field indicates a maximum value of disparity that can be expressed in a 3D video that is included in a 3D service, program, or event, wherein the 3D depth information descriptor is applied. More specifically, the max_disparity field indicates a disparity value corresponding to the depth of a point that is formed at a furthest distance between the broadcast receiver and the user.

The above-described min_disparity field and max_disparity field may also be indicated by depth values. More specifically, with respect to the plane display surface of the broadcast receiver on which the 3D video is being displayed, the distance may be expressed by using (+) and (−).

The 3D Depth Information Descriptor according to the embodiment of the present invention may be included in a Program Map Table (PMT), a Virtual Channel Table (VCT), a Service Description Table (SDT), and/or an Event Information Table (EIT). For example, depending upon the table including the 3D Depth Information Descriptor, information within the 3D Depth Information Descriptor may be applied to the 3D video of the respective level.

By parsing and recognizing the above-described descriptor information, the broadcast receiver may be aware of the maximum/minimum 3D depth values during the running time (or broadcasting time) of a specific 3D service, program, or contents. Accordingly, the broadcasting receiver according to the present invention may refer to the maximum/minimum 3D depth values so as to decide the depth level at which the OSD of the broadcast receiver should be displayed. For example, the OSD may be displayed so that the OSD does not overlay with the 3D image (or video), or the OSD may be displayed with a 3D effect further apart from the user than any of the other 3D images (or videos) that are currently being displayed. A display depth of the PSD based upon a depth of the 3D video (or image) may also be set up by the user.

FIG. 2 illustrates a 3D Depth Information Descriptor according to another embodiment of the present invention.

The descriptor shown in FIG. 2 may signal a min_disparity field value and/or a max_disparity field value for each scene included in the 3D broadcast video. Therefore, the 3D Depth Information Descriptor may also be referred to as a 3D Scene-level Depth Information Descriptor.

In the present invention, a scene may correspond to a context-based segment with content. Alternatively, a scene may also correspond to a time segment, which is essentially defined by a start time and a section duration. More specifically, for example, even when the 3D Depth Information Descriptor according to the embodiment of the present invention is signaled through a PMT, a Terrestrial Virtual Channel Table (TVCT), or an EIT, a scene may be defined by an absolute time segment and an absolute section size without any correlation with the respective program or event.

A descriptor_tag field identifies a descriptor to which the field belongs.

A descriptor_length field indicates the length of data following the descriptor_length field in bytes, wherein the data belong to the 3D Depth Information Descriptor.

A scene_format_type field identifies a method for dividing a scene into areas to which values of a min_disparity field and/or a max_disparity field, which belong to the 3D Depth Information Descriptor, are to be applied. The scene_format_type field will be described in more detail later on with reference to FIG. 3.

A first_scene_start_time field corresponds to a field that notifies a base time respective to the scenes that are signaled by the 3D Depth Information Descriptor. More specifically, the first_scene_start_time field signifies the start time of a first scene. Herein, the start time is indicated by hour-unit, and the start time may range from 0 to 23 hours. For example, time information for each scene may be known based upon a scene_id field and a scene_start_time field. However, the first_scene_start_time field corresponds to a field notifying the reference time.

A number_of_scenes field indicates a number of scenes from which depth information may be recognized by using the 3D Scene-level Depth Information descriptor that is currently being transmitted.

A scene_duration field indicates a time length representing the duration of the corresponding scene. For example, the length of a scene may be expressed in seconds.

A scene_id field corresponds to an identifier for each scene. In case the scene_start_time field does not exist, the start time may be signaled implicitly. For example, the value of the scene_id field may start from 0. An exact application point for the time span of each scene may be determined by using the first_scene_start_time field.

A min_disparity field indicates a minimum value of disparity that can be expressed in a 3D video that is included in a 3D service, program, or event, wherein the 3D Scene-level depth information descriptor is applied. More specifically, the min_disparity field indicates a disparity value corresponding to the depth of a point that is formed at a nearest distance between the broadcast receiver and the user.

A max_disparity field indicates a maximum value of disparity that can be expressed in a 3D video that is included in a 3D service, program, or event, wherein the 3D Scene-level depth information descriptor is applied. More specifically, the max_disparity field indicates a disparity value corresponding to the depth of a point that is formed at a furthest distance between the broadcast receiver and the user.

A scene_start_time field indicates the start time of each scene. Herein, the start time may be indicated by using a variety of methods. For example, the start time may be expressed in GPS seconds based upon Jan. 6, 1980, 00:00. In this case, 32 bits may be used for the scene_start_time field. As another example, the scene_start_time field may be expressed in elapsed seconds based upon the first_scene_start_time field. For example, when the 3D Scene-level depth information descriptor is received as 07:30, and when the value of the first_scene_start_time field is equal to 7, 07:40 is expressed as 2,400 seconds, and this value may be used as the value of the scene_start_time field.

When using the above-described descriptor, the broadcast receiver may recognize the display position of the OSD for each specific scene. The broadcast receiver translates the 3D Scene-level depth information descriptor. Then, at the moment the user of the broadcast receiver calls on an OSD, the broadcast receiver may decide the position where the OSD is to be displayed. As described above, the display position of the OSD, which is to be displayed at this point, may be decided as the top section of all 3D videos or as the bottom section of all 3D videos.

Depending upon the OSD called by the user, the broadcast receiver receives the depth information respective to at least one or more scenes. Thereafter, the broadcast receiver may display the OSD at a depth that seems to be closer to the user as compared to the depth indicated by the min_disparity field, which has the minimum value. For example, since an OSD for adjusting the volume may be manipulated in a short time, the broadcast receiver may decide the depth of the OSD for adjusting the volume by using the depth information respective to the scene corresponding to the moment when the user calls on the OSD. Conversely, an OSD for adjusting screen settings requires a longer manipulation time. Therefore, the broadcast receiver acquires depth information corresponding to the scene displayed at the moment the user called on the OSD for adjusting screen settings and also acquires depth information corresponding to the subsequent scenes, so that the OSD for adjusting screen settings can be displayed to seem closer to the user than any other 3D videos. More specifically, even when an OSD is displayed during a scene change, the broadcast receiver maintains the depth of the displayed OSD. Thus, the user may experience less visual fatigue.

FIG. 3 illustrates the significance of a scene_format_type field value according to an embodiment of the present invention.

As described above, when the broadcast receiver is required to overlay a menu or other graphic data over the 3D video image at an arbitrary time, and when the min_disparity value of the corresponding time is known, a conflict in depth between objects of the 3D video and graphics, menus, icons, and so on. In this case, the scene_format_type field signals a method for applying depth in each scene.

For example, when scene_format_type="10", the time point at which the depth information is applied may be recognized by using the scene_id field. As described above, the 3D scene-level depth information descriptor provides depth range information of the 3D video for each scene. According to the embodiment of the present invention, the scene_duration field is fixed in the same descriptor or in the same PMT/TVCT/EIT section instance. Herein, all scenes may have the same length. And, the length of each scene may be defined by the scene_duration field. More specifically, the 3D scene-level depth information descriptor provides depth range information of the 3D video in the above-described time units indicated by the scene_duration field.

For example, when scene_duration=1200 (20 minutes), scene_id=0 signifies a time segment of 20 minutes starting from the time indicated by the first_scene_start_time field. At this point, when first_scene_start_time=19, and when the broadcast receiver wishes to output an OSD at 07:30 p.m., the broadcast receiver may use the information corresponding to when scene_id=1, in order to determine the adequate depth range.

For example, when scene_format_type="11", each scene may be clearly defined to have a length equivalent to the scene_duration field value starting from the time indicated by the scene_start_time field. In this case, even if the scenes belong to the same descriptor, each scene may be set to have different lengths. When the broadcast receiver outputs an OSD at a specific time point while the 3D video is being played, the broadcast receiver may determine the scene belonging to the current time, so as to use the corresponding depth range information.

In some cases, programs or events having different contents may be inter-mixed in a single scene. Accordingly, when scene division is performed based upon the content or context of the corresponding 3D video, the scene_format_type field may be set to "11", and information corresponding to each section may be transmitted. Furthermore, when the depth information cannot be known in advance, such as in live broadcasting, the min_disparity field value and the max_disparity field value may both be set to 0.

FIG. 4 illustrates a concept of 3D scene depth stream transmission based upon an Asynchronous depth information transmission method according to an embodiment of the present invention.

Program A corresponds to a 3D program. Herein, Program A may consist of a video Elementary Stream (ES) for a left-view image (or video), a video ES for a right-view image (or video), and 3D scene depth information including depth information of the 3D video. At this point, the 3D scene depth information may be transmitted by using the conventional signaling tables, such as the PMT, the TVCT, the SDT, and/or the EIT. According to another embodiment of the present invention, the 3D scene depth information may also be transmitted in a Packetized Elementary Stream (PES) format instead of a descriptor format.

FIG. 5 illustrates a syntax corresponding to when a 3D scene depth stream is transmitted in a PES packet format according to an embodiment of the present invention.

A sync_byte field is used to authenticate synchronization during a process of parsing a segment.

A segment_type field indicates a type of the data belonging to the segment data field.

A scene_data_type field specifies a method for applying the depth information.

For example, when scene_data_type="01", it may be defined that the 3D scene depth information stream transmits the depth range in event units. In this case, each scene is mapped to a single event, and, by using a target_event_id field, the broadcast receiver recognizes the event to which the depth range is applied. The broadcast receiver matches the target_event_id field with an event_id field included in an EIT, thereby recognizing information on the corresponding event.

For example, when scene_data_type="10", the time point at which the depth information is applied may be recognized by using the scene_id field. As described above, the 3D scene depth information stream provides depth range information of the 3D video for each scene. According to the embodiment of the present invention, the scene_duration field may be defined to be fixed in the same 3D scene depth information stream. In other words, all scenes may have the same length. And, the length of each scene may be defined by the scene_duration field. More specifically, the 3D scene depth information stream provides depth range information of the 3D video in the above-described time units indicated by the scene_duration field.

For example, when scene_duration=1200 (20 minutes), scene_id=0 signifies a time segment of 20 minutes starting from the time indicated by the first_scene_start_time field. At this point, when first_scene_start_time=19, and when the broadcast receiver wishes to output an OSD at 07:30 p.m., the broadcast receiver may use the information corresponding to when scene_id=1, in order to determine the adequate depth range.

For example, when scene_data_type="11", each scene may be clearly defined to have a length equivalent to the scene_duration field value starting from the time indicated by the scene_start_time field. In this case, even if the scenes belong to the same descriptor, each scene may be set to have different lengths. When the broadcast receiver outputs an OSD at a specific time point while the 3D video is being played, the broadcast receiver may determine the scene belonging to the current time, so as to use the corresponding depth range information.

A first_scene_start_time field corresponds to a field that notifies a base time respective to the scenes that are signaled by the current descriptor (3D Scene-level Depth Information descriptor). More specifically, the first_scene_start_time field signifies the start time of a first scene. Herein, the start time is indicated by hour-unit, and the start time may range from 0 to 23 hours. For example, time information for each scene may be known based upon a scene_id field and a scene_start_time field. However, the first_scene_start_time field corresponds to a field notifying the reference time.

A number_of_scenes field indicates a number of scenes from which depth information may be recognized by using the 3D Scene-level Depth Information descriptor that is currently being transmitted.

A target_event_id field identifies an event to which the above-described depth information is applied.

A min_disparity field indicates a minimum value of disparity that can be expressed in a 3D video that is included in a 3D service, program, or event, wherein the 3D Scene-level depth information descriptor is applied. More specifically, the min_disparity field indicates a disparity value corresponding to the depth of a point that is formed at a nearest distance between the broadcast receiver and the user.

A max_disparity field indicates a maximum value of disparity that can be expressed in a 3D video that is included in a 3D service, program, or event, wherein the 3D Scene-level depth information descriptor is applied. More specifically, the max_disparity field indicates a disparity value corresponding to the depth of a point that is formed at a furthest distance between the broadcast receiver and the user.

A scene_duration field indicates a time length representing the duration of the corresponding scene. For example, the length of a scene may be expressed in seconds.

A scene_id field corresponds to an identifier for each scene. In case the scene_start_time field does not exist, the start time may be signaled implicitly. For example, the value of the scene_id field may start from 0. An exact application point for the time span of each scene may be determined by using the first_scene_start_time field.

A scene_start_time field indicates the start time of each scene. Herein, the start time may be indicated by using a variety of methods. For example, the start time may be expressed in GPS seconds based upon Jan. 6, 1980, 00:00. In this case, 32 bits may be used for the scene_start_time field. As another example, the scene_start_time field may be expressed in elapsed seconds based upon the first_scene_start_time field. For example, when the 3D Scene-level depth information descriptor is received as 07:30, and when the value of the first_scene_start_time field is equal to 7, 07:40 is expressed as 2,400 seconds, and this value may be used as the value of the scene_start_time field.

According to the embodiment of the present invention, even if a large amount of data is required in order to transmit 3D depth information, the 3D depth information may be adequately signaled.

FIG. 6 illustrates a 3D Depth Range Descriptor according to an embodiment of the present invention.

The 3D Depth Range Descriptor may be located in an ES descriptor loop of the PMT or in a descriptor loop of the TVCT or SDT. In case the ES corresponds to the 3D scene depth information, the 3D Depth Range Descriptor performs the role of notifying the time period during which the corresponding stream provides the depth range information. When using the 3D Depth Range Descriptor, the time point at which the 3D depth is applied and information on the 3D depth may be signaled separately.

Since the descriptor_tag field and the descriptor_length field have the same meaning as the same fields included in another descriptor described above, detailed description of the same will be omitted for simplicity.

A 3D_scene_depth_info_version field corresponds to version information of the 3D scene depth information. Herein, the broadcast receiver uses the 3D_scene_depth_info_version field so as to determine whether or not the depth range information has been updated. Accordingly, by referring to the information on the 3D_scene_depth_info_version field, and when it is determined that there is no change in the version information, the broadcast receiver may be capable of avoiding an overlapped performance of operations required for reading the depth information.

A first_scene_start_time field indicates the first (or initial) start time at which the depth range information included in the 3D scene depth information is applied. For example, the first_scene_start_time field may be indicated in GPS seconds based upon Jan. 6, 1980, 00:00. In this case, 32 bits may be used for the first_scene_start_time field.

A last_scene_start_time field indicates the last (or final) start time at which the depth range information included in the 3D scene depth information is applied. For example, the last_scene_start_time field may be indicated in GPS seconds based upon Jan. 6, 1980, 00:00. In this case, 32 bits may be used for the last_scene_start_time field.

The broadcast receiver may use the first_scene_start_time field and/or the last_scene_end_time field so as to determine the time periods during which the depth range information included in the 3D scene depth information is valid.

FIG. 7 illustrates a 3D Depth Range Descriptor according to another embodiment of the present invention.

According to the other embodiment of the present invention, the 3D Depth Range Descriptor may be included in a VCT or an SDT.

In addition to the fields described in FIG. 6, the 3D Depth Range Descriptor shown in FIG. 7 further includes a 3D_scene_depth_info_PID field.

The 3D_scene_depth_info_PID field includes information for identifying a Packet that transmits a 3D scene.

In case the 3D Depth Range Descriptor is applied to the SDT, the 3D_scene_depth_info_PID field may be replaced with a component_tag.

FIG. 8 illustrates a component descriptor according to an embodiment of the present invention.

Since the descriptor_tag field and the descriptor_length field have the same meaning as the same fields included in another descriptor described above, detailed description of the same will be omitted for simplicity.

stream_content is a 4-bit field specifying the type (video, audio, or EBU-data) of stream.

component_type is a 8-bit field specifying the type of the video, audio or EBU-data component.

component_tag is a 8-bit field that has the same value as the component_tag field in the stream identifier descriptor (if present in the PSI program map section) for the component stream.

ISO_639_language_code is a 24-bit field that identifies the language of the component (in the case of audio or EBU-data) and of the text description which may be contained in this descriptor. Both ISO 639-2/B and ISO 639-2/T may be used. Each character is coded into 8 bits according to ISO/IEC 8859-1 and inserted in order into the 24-bit field.

text_char is an 8-bit field. A string of "text_char" fields specifies a text description of the component stream.

A component descriptor is added to a descriptor loop of an SDT so as to indicate the type of each elementary stream configuring the services in DVB, and the added component descriptor is signaled. According to an embodiment of the present invention, a stream_content field and a component_type field are used so as identify the stream configured for the 3D Scene Depth information.

The Stream_content field indicates a stream type. Herein, the stream_content field is defined as 0x09 for additional data, such as metadata for the 3D contents. The value of the Stream_content field, which is defined as above-described, is merely exemplary, and, therefore, the value of the Stream_content field may be defined differently. Examples of such additional data may include a 3D Scene depth range, a Viewing Geometry parameter, a Camera Parameter, and so on.

Herein, a component_type field for a component carrying the 3D Scene Depth Information within the current stream content may be additionally used.

FIG. 9 illustrates definitions of a stream_content field value and a component_type field value for indicating the 3D Scene Depth Information stream according to an embodiment of the present invention.

As described above, the values defined in the present invention may be changed to other values.

A method for identifying a stream carrying the 3D Scene Depth Information by using the additionally defined component type will now be described in detail.

Among the Component descriptors included in the SDT, by verifying that the Stream content is 0x09 and that the component type is 0x01, the broadcast receiver may verify the component tag of the 3D Scene Depth Information stream. (Component_tag_D)

Among the Elementary streams within the ES Loop of the PMT corresponding to the above-described SDT, the broadcast receiver uses the Stream identifier descriptor so as to verify the ES including component_tag_D, which is acquired in Step 1, thereby acquiring the PID of the verified ES. (PID_D)

Thereafter, the broadcast receiver extracts a stream corresponding to the acquired PID_D so as to determined the 3D Scene Depth information.

FIG. 10 illustrates a location of a PMT and locations wherein the above-described descriptors can be included within the PMT according to an embodiment of the present invention.

table_id field is an 8-bit field, which in the case of a TS_program_map_section shall be always set to 0x02.

section_syntax_indicator field is a 1-bit field which shall be set to '1'.

section_length field is a 12-bit field, the first two bits of which shall be '00'. The remaining 10 bits specify the number of bytes of the section starting immediately following the section_length field, and including the CRC. The value in this field shall not exceed 1021 (0x3FD).

program_number field is a 16-bit field. It specifies the program to which the program_map_PID is applicable. One program definition shall be carried within only one TS_program_map_section. This implies that a program definition is never longer than 1016 (0x3F8). The program_number may be used as a designation for a broadcast channel, for example. By describing the different program elements belonging to a program, data from different sources (e.g. sequential events) can be concatenated together to form a continuous set of streams using a program_number.

version_number field is the version number of the TS_program_map_section. The version number shall be incremented by 1 modulo 32 when a change in the information carried within the section occurs. Version number refers to the definition of a single program, and therefore to a single section. When the current_next_indicator is set to '1', then the version_number shall be that of the currently applicable TS_program_map_section. When the current_next_indicator is set to '0', then the version_number shall be that of the next applicable TS_program_map_section.

current_next_indicator field, which when set to '1' indicates that the TS_program_map_section sent is currently applicable. When the bit is set to '0', it indicates that the TS_program_map_section sent is not yet applicable and shall be the next TS_program_map_section to become valid.

The value of the section_number field shall be 0x00.

The value of the last_section_number field shall be 0x00.

PCR_PID field is a 13-bit field indicating the PID of the Transport Stream packets which shall contain the PCR fields valid for the program specified by program_number. If no PCR is associated with a program definition for private streams, then this field shall take the value of 0x1FFF.

program_info_length field is a 12-bit field, the first two bits of which shall be '00'. The remaining 10 bits specify the number of bytes of the descriptors immediately following the program_info_length field.

stream_type field is an 8-bit field specifying the type of program element carried within the packets with the PID whose value is specified by the elementary_PID.

elementary_PID field is a 13-bit field specifying the PID of the Transport Stream packets which carry the associated program element.

ES_info_length field is a 12-bit field, the first two bits of which shall be '00'. The remaining 10 bits specify the number of bytes of the descriptors of the associated program element immediately following the ES_info_length field.

CRC_32 field is a 32-bit field that contains the CRC value that gives a zero output of the registers in the decoder.

Among the above-described descriptors, at least any one of the descriptors may be included in a for loop configured for descriptors following the program_info_length field, thereby being signaled. Additionally, the at least any one of the descriptors may also be included in a for loop configured for descriptors following the ES_info_length field, thereby being signaled.

Thus, the descriptor included in the PMT signals information on the 3D depth of an event related to the corresponding loop.

When transmitting information on 3D depth by using the 3D Scene Depth Information stream, the broadcast receiver may use a stream_type field so as to notify that the corresponding stream is the 3D Scene Depth Information. For example, in case the stream_type field value is equal to 0x06, this may indicate that the type of the stream corresponds to ISO/IEC 13818-1 PES packets containing private data. In case the stream_type field value is equal to 0xA0, the broadcast receiver may use the value of the 3D scene-level depth range information stream.

When the broadcast receiver uses the value 0x06 to indicate the stream type, based upon the knowledge that the 3D Depth Range Descriptor exists in the ES descriptor loop, the broadcast receiver may determine that the private data of the corresponding ES carry the 3D scene-level depth range information.

In case of a DVB system, by having the SDT designate stream content and Component type values for the 3D Scene Depth Information proposed in the present invention, and by having the SDT signal the designated values, a respective stream may be identified.

FIG. 11 illustrates locations wherein the TVCT and the above-described descriptors can be included according to an embodiment of the present invention.

The value of the table_id field indicates the type of table section being defined here. For the terrestrial_virtual_channel_table_section( ), the table_id shall be 0xC8.

section_syntax_indicator field is a one-bit field which shall be set to '1' for the terrestrial_virtual_channel_table_section( ).

private_indicator field shall be set to '1'.

section_length field is a twelve bit field, the first two bits of which shall be '00'. It specifies the number of bytes of the section, starting immediately following the section_length field, and including the CRC. The value in this field shall not exceed 1021.

transport_stream_id field, the 16-bit MPEG-2 Transport Stream ID, as it appears in the Program Association Table (PAT) identified by a PID value of zero for this multiplex. The transport_stream_id distinguishes this Terrestrial Virtual Channel Table from others that may be broadcast in different PTCs.

version_number field is the version number of the Virtual Channel Table. For the current VCT (current_next_indicator='1'), the version number shall be incremented by 1 whenever the definition of the current VCT changes. Upon reaching the value 31, it wraps around to 0. For the next VCT (current_next_indicator='0'), the version number shall be one unit more than that of the current VCT (also in modulo 32 arithmetic). In any case, the value of the version_number shall be identical to that of the corresponding entries in the MGT.

current_next_indicator field, a one-bit indicator, which when set to '1' indicates that the Virtual Channel Table sent is currently applicable. When the bit is set to '0', it indicates that the table sent is not yet applicable and shall be the next table to become valid. This standard imposes no requirement that "next" tables (those with current_next_indicator set to '0') must be sent. An update to the currently applicable table shall be signaled by incrementing the version_number field.

section_number field gives the number of this section. The section_number of the first section in the Terrestrial Virtual Channel Table shall be 0x00. It shall be incremented by one with each additional section in the Terrestrial Virtual Channel Table.

last_section_number specifies the number of the last section (that is, the section with the highest section_number) of the complete Terrestrial Virtual Channel Table.

protocol_version field whose function is to allow, in the future, this table type to carry parameters that may be structured differently than those defined in the current protocol. At present, the only valid value for protocol_version is zero. Non-zero values of protocol_version may be used by a future version of this standard to indicate structurally different tables.

num_channels_in_section field specifies the number of virtual channels in this VCT section. The number is limited by the section length.

short_name field specifies the name of the virtual channel.

major_channel_number field, a 10-bit number that represents the "major" channel number associated with the virtual channel being defined in this iteration of the "for" loop. Each virtual channel shall be associated with a major and a minor channel number. The major channel number, along with the minor channel number, act as the user's reference number for the virtual channel. The major_channel_number shall be between 1 and 99. The value of major_channel_number shall be set such that in no case is a major_channel_number/minor_channel_number pair duplicated within the TVCT.

minor_channel_number field, a 10-bit number in the range 0 to 999 that represents the "minor" or "sub"-channel number. This field, together with major_channel_number, performs as a two-part channel number, where minor_channel_number represents the second or right-hand part of the number. When the service_type is analog television, minor_channel_number shall be set to 0. Services whose service_type is either ATSC_digital_television or ATSC_audio_only shall use minor numbers between 1 and 99. The value of minor_channel_number shall be set such that in no case is a major_channel_number/minor_channel_number pair duplicated within the TVCT. For other types of services, such as data broadcasting, valid minor virtual channel numbers are between 1 and 999.

modulation_mode field indicates the modulation mode for the transmitted carrier associated with this virtual channel.

The value of the carrier_frequency field is zero. Use of this field to identify carrier frequency is allowed, but is deprecated.

channel_TSID field in the range 0x0000 to 0xFFFF that represents the MPEG-2 Transport Stream ID associated with the Transport Stream carrying the MPEG-2 program referenced by this virtual channel 8. For inactive channels, channel_TSID shall represent the ID of the Transport Stream that will carry the service when it becomes active. The receiver is expected to use the channel_TSID to verify that any received Transport Stream is actually the desired multiplex. For analog channels (service_type 0x01), channel_TSID shall indicate the value of the analog TSID included in the VBI of the NTSC signal.

program_number field that associates the virtual channel being defined here with the MPEG-2 PROGRAM ASSOCIATION and TS PROGRAM MAP tables. For virtual channels representing analog services, a value of 0xFFFF shall be specified for program_number.

ETM_location field specifies the existence and the location of an Extended Text Message (ETM).

access_controlled field, a 1-bit Boolean flag that indicates, when set, that the events associated with this virtual channel may be access controlled. When the flag is set to '0', event access is not restricted.

hidden field, a 1-bit Boolean flag that indicates, when set, that the virtual channel is not accessed by the user by direct entry of the virtual channel number. Hidden virtual channels are skipped when the user is channel surfing, and appear as if undefined, if accessed by direct channel entry. Typical applications for hidden channels are test signals and NVOD services. Whether a hidden channel and its events may appear in EPG displays depends on the state of the hide_guide bit.

hide_guide field, a Boolean flag that indicates, when set to '0' for a hidden channel, that the virtual channel and its events may appear in EPG displays. This bit shall be ignored for channels which do not have the hidden bit set, so that non-hidden channels and their events may always be included in EPG displays regardless of the state of the hide_guide bit. Typical applications for hidden channels with the hide_guide bit set to '1' are test signals and services accessible through application-level pointers.

service_type field that shall identify the type of service carried in this virtual channel.

source_id field identifies the programming source associated with the virtual channel. In this context, a source is one specific source of video, text, data, or audio programming. Source ID value zero is reserved. Source ID values in the range 0x0001 to 0x0FFF shall be unique within the Transport Stream that carries the VCT, while values 0x1000 to 0xFFFF shall be unique at the regional level. Values for source_ids 0x1000 and above shall be issued and administered by a Registration Authority designated by the ATSC.

descriptors_length field specifies total length (in bytes) of the descriptors for this virtual channel that follows.

Zero or more descriptors, as appropriate, may be included in descriptor( )

additional_descriptors_length field specifies total length (in bytes) of the VCT descriptor list that follows.

CRC_32 field contains the CRC value that ensures a zero output from the registers in the decoder.

Among the above-described descriptors, at least any one of the descriptors may be included in a for loop configured for descriptors following the descriptors_length field, thereby being signaled.

When the broadcast receiver uses the Service Location Descriptor, which is defined in the ATSC PSI/PSIP, so as to signal the 3D Scene Depth Information, the broadcast receiver uses the stream_type field in order to indicate that the ES correspond to the depth information. And, at this point, the descriptor shown in FIG. 6 is used as the format of the 3D Depth Range Descriptor, instead of the descriptor shown in FIG. 7.

FIG. 12 illustrates locations wherein the EIT and the above-described descriptors can be included according to an embodiment of the present invention.

table_id is an 8-bit field which shall be set to 0xCB, identifying this section as belonging to the Event Information Table.

section_syntax_indicator is an 1-bit field which shall be set to '1'. It denotes that the section follows the generic section syntax beyond the section length field.

private_indicator is an 1-bit field which shall be set to '1'.

section_length is a 12-bit field specifying the number of remaining bytes in this section immediately following the section_length field up to the end of the section, including the CRC_32 field. The value of this field shall not exceed 4093.

source_id is a 16-bit field specifying the source_id of the virtual channel carrying the events described in this section.

version_number is a 5-bit field that is the version number of EIT-i. The version number shall be incremented by 1 modulo 32 when any field in the EIT-i changes. Note that the version_number for EIT-i has no relation with that for EIT-j when j is not equal to i. The value of this field shall be identical to that of the corresponding entry in the MGT.

current_next_indicator is an 1-bit indicator which is always set to '1' for EIT sections; the EIT sent is always currently applicable.

section_number is an 8-bit field giving the number of this section.

last_section_number is an 8-bit field which specifies the number of the last section.

protocol_version is an 8-bit unsigned integer field whose function is to allow, in the future, this table type to carry parameters that may be structured differently than those defined in the current protocol. At present, the only valid value for protocol_version is zero. Non-zero values of protocol_version may be used by a future version of this standard to indicate structurally different tables.

num_events_in_section field indicates the number of events in this EIT section. Value 0 indicates no events defined in this section.

event_id field specifies the identification number of the event described. This number will serve as a part of the event ETM_id (identifier for event extended text message).

start_time is a 32-bit unsigned integer quantity representing the start time of this event as the number of GPS seconds since 00:00:00 UTC, 6 Jan. 1980. In any virtual channel, the start_time value of an event shall not be less than the end time of the preceding event where the end time of an event is defined to be equal to that event's start_time value plus that event's length_in_seconds value.

ETM_location is a 2-bit field specifying the existence and the location of an Extended Text Message (ETM).

length_in_seconds field specifies duration of this event in seconds.

title_length field specifies the length (in bytes) of the title_text( ). Value 0 means that no title exists for this event.

title_text( ) is the event title in the format of a multiple string structure.

descriptors_length field indicates total length (in bytes) of the event descriptor list that follows.

Zero or more descriptors may be included in the EIT in an iteration of the event "for" loop included in descriptor( ). The types of descriptors defined for use in the EIT include the content_advisory_descriptor( ), the caption_service_descriptor( ) and the AC-3 audio_stream_descriptorQ.

CRC_32 is a 32-bit field that contains the CRC value that ensures a zero output from the registers in the decoder.

Among the above-described descriptors, at least any one of the descriptors may be included in a for loop configured for descriptors following the descriptors_length field, thereby being signaled.

By using the descriptors included in the EIT, signaling on the current event and the next event may be performed.

FIG. 13 illustrates locations wherein the SDT and the above-described descriptors can be included according to an embodiment of the present invention.

table_id is an 8-bit field identifying this section as belonging to the Service Description Table.

section_syntax_indicator is a 1-bit field which shall be set to "1".

section_length is a 12-bit field, the first two bits of which shall be "00". It specifies the number of bytes of the section, starting immediately following the section_length field and including the CRC. The section_length shall not exceed 1 021 so that the entire section has a maximum length of 1 024 bytes.

transport_stream_id is a 16-bit field which serves as a label for identification of the TS, about which the SDT informs, from any other multiplex within the delivery system.

version_number is a 5-bit field that is the version number of the sub_table. The version_number shall be incremented by 1 when a change in the information carried within the sub_table occurs. When it reaches value "31", it wraps around to "0". When the current_next_indicator is set to "1", then the version_number shall be that of the currently applicable sub_table. When the current_next_indicator is set to "0", then the version_number shall be that of the next applicable sub_table.

current_next_indicator is an 1-bit indicator, when set to "1" indicates that the sub_table is the currently applicable sub_table. When the bit is set to "0", it indicates that the sub_table sent is not yet applicable and shall be the next sub_table to be valid.

section_number is an 8-bit field giving the number of the section. The section_number of the first section in the sub_table shall be "0x00". The section_number shall be incremented by 1 with each additional section with the same table_id, transport_stream_id, and original_network_id.

last_section_number is an 8-bit field specifying the number of the last section (that is, the section with the highest section_number) of the sub_table of which this section is part.

original_network_id is a 16-bit field giving the label identifying the network_id of the originating delivery system.

service_id is a 16-bit field which serves as a label to identify this service from any other service within the TS. The service_id is the same as the program_number in the corresponding program_map_section.

EIT_schedule_flag is a 1-bit field which when set to "1" indicates that EIT schedule information for the service is present in the current TS. If the flag is set to 0 then the EIT schedule information for the service should not be present in the TS.

EIT_present_following_flag is a 1-bit field which when set to "1" indicates that EIT_present_following information for the service is present in the current TS. If the flag is set to 0 then the EIT present/following information for the service should not be present in the TS.

running_status is a 3-bit field indicating the status of the service.

free_CA_mode is an 1-bit field, when set to "0" indicates that all the component streams of the service are not scrambled. When set to "1" it indicates that access to one or more streams may be controlled by a CA system.

descriptors_loop_length is a 12-bit field gives the total length in bytes of the following descriptors.

CRC_32 is a 32-bit field that contains the CRC value that gives a zero output of the registers in the decoder.

Among the above-described descriptors, at least any one of the descriptors may be included in a for loop configured for descriptors following the descriptors_loop_length field, thereby being signaled.

According to an embodiment of the present invention, the descriptors included in the SDT may signal information on the 3D depth respective to a service, which is signaled by the current SDT.

FIG. 14 illustrates locations wherein the EIT and the above-described descriptors can be included according to an embodiment of the present invention.

table_id is an 8-bit field identifying this section as belonging to the Service Description Table.

section_syntax_indicator is a 1-bit field which shall be set to "1".

section_length is a 12-bit field. It specifies the number of bytes of the section, starting immediately following the section_length field and including the CRC. The section_length shall not exceed 4 093 so that the entire section has a maximum length of 4 096 bytes.

service_id is a 16-bit field which serves as a label to identify this service from any other service within a TS. The service_id is the same as the program_number in the corresponding program_map_section.

version_number is a 5-bit field is the version number of the sub_table. The version_number shall be incremented by 1 when a change in the information carried within the sub_table occurs. When it reaches value 31, it wraps around to 0. When the current_next_indicator is set to "1", then the version_number shall be that of the currently applicable sub_table. When the current_next_indicator is set to "0", then the version_number shall be that of the next applicable sub_table.

current_next_indicator is an 1-bit indicator, when set to "1" indicates that the sub_table is the currently applicable sub_table. When the bit is set to "0", it indicates that the sub_table sent is not yet applicable and shall be the next sub_table to be valid.

section_number is an 8-bit field giving the number of the section. The section_number of the first section in the sub_table shall be "0x00". The section_number shall be incremented by 1 with each additional section with the same table_id, service_id, transport_stream_id, and original_network_id.

In this case, the sub_table may be structured as a number of segments. Within each segment the section_number field shall increment by 1 with each additional section, but a gap in numbering is permitted between the last section of a segment and the first section of the adjacent segment.

last_section_number is an 8-bit field specifying the number of the last section (that is, the section with the highest section_number) of the sub_table of which this section is part.

transport_stream_id is a 16-bit field which serves as a label for identification of the TS, about which the EIT informs, from any other multiplex within the delivery system.

original_network_id is a 16-bit field giving the label identifying the network_id of the originating delivery system.

segment_last_section_number is an 8-bit field specifies the number of the last section of this segment of the sub_table. For sub_tables which are not segmented, this field shall be set to the same value as the last_section_number field.

last_table_id is an 8-bit field identifies the last table_id used.

event_id is a 16-bit field which contains the identification number of the described event (uniquely allocated within a service definition).

start_time is a 40-bit field which contains the start time of the event in Universal Time, Co-ordinated (UTC) and Modified Julian Date (MJD). This field is coded as 16 bits giving the 16 LSBs of MJD followed by 24 bits coded as 6 digits in 4-bit Binary Coded Decimal (BCD). If the start time is undefined (e.g. for an event in a NVOD reference service) all bits of the field are set to "1".

Duration is a 24-bit field containing the duration of the event in hours, minutes, seconds. format: 6 digits, 4-bit BCD=24 bit.

running_status is a 3-bit field indicating the status of the event as defined in table 6. For an NVOD reference event the value of the running_status shall be set to "0".

free_CA_mode is an 1-bit field, when set to "0" indicates that all the component streams of the event are not scrambled. When set to "1" it indicates that access to one or more streams is controlled by a CA system.

descriptors_loop_length is a 12-bit field giving the total length in bytes of the following descriptors.

CRC_32 is a 32-bit field that contains the CRC value that gives a zero output of the registers in the decoder.

Among the above-described descriptors, at least any one of the descriptors may be included in a for loop configured for descriptors following the descriptors_loop_length field, thereby being signaled.

For example, by using the descriptors included in the EIT, information on the 3D depth respective to the current event and the next event may be signaled.

Figure 15:
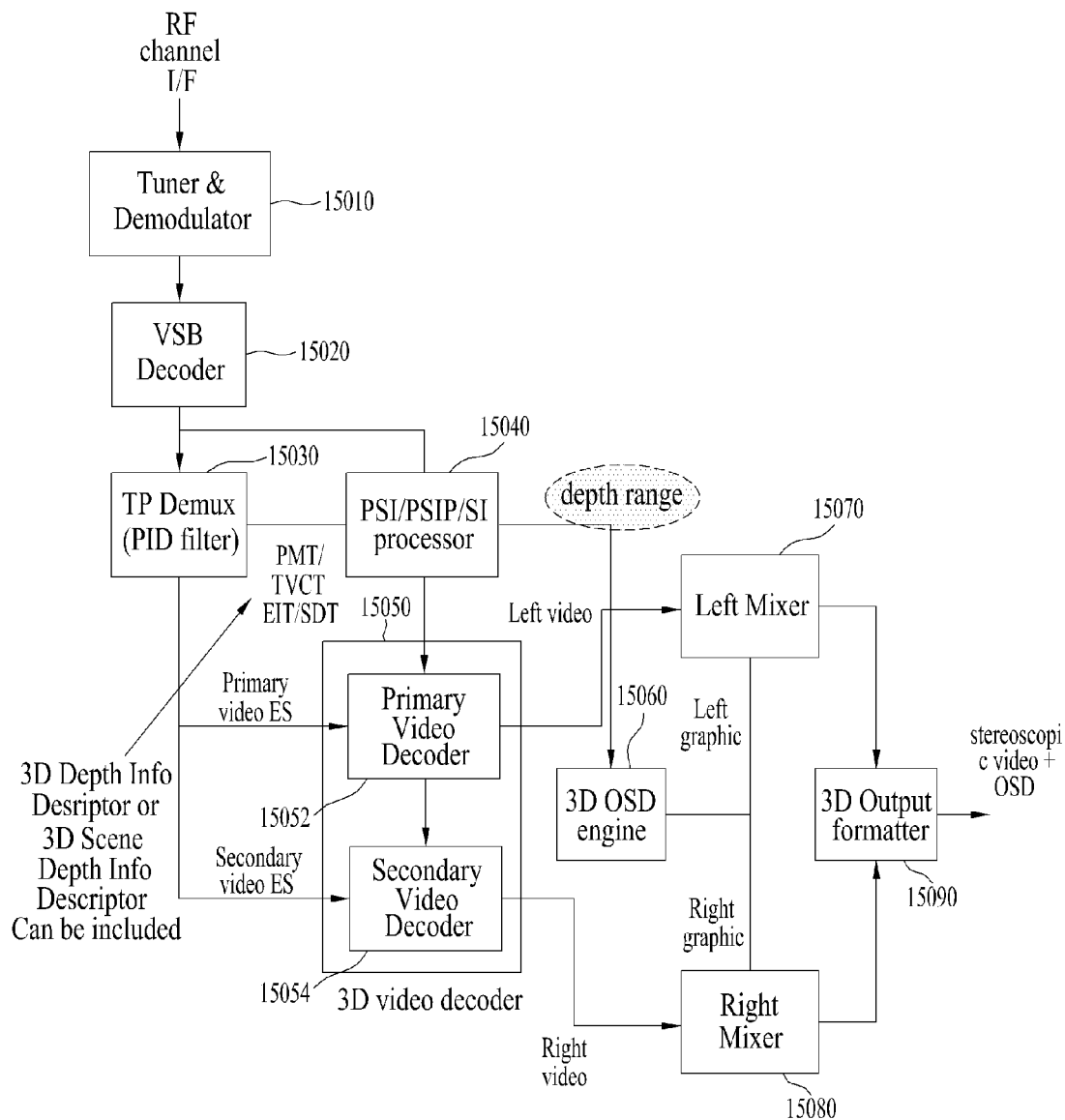
FIG. 15 illustrates a block view of a broadcast receiver for receiving and processing 3D video images according to an embodiment of the present invention.

FIG. 15 illustrates a block view of a broadcast receiver for receiving and processing 3D video images according to an embodiment of the present invention.

The broadcast receiver according to the embodiment of the present invention may include a Tuner & Demodulator (15010), a VSB decoder (15020), a transport packet demultiplexer (TP Demux) (15030), a PSI/PSIP/SI processor (15040), a 3D video decoder (15050), a primary video decoder (15052), a secondary video decoder (15054), a 3D OSD engine (15060), a left mixer (15070), a right mixer (15080), and/or a 3D output formatter (15090).

The Tuner & Demodulator (15010) tunes to a 3D broadcast channel and demodulates received signals.

The VSB decoder (15020) decodes signals having VSB applied therein (or VSB signals). Although this block is referred to as the VSB decoder, this block may also be considered as a block configured to decode signals having OFDM applied therein (or OFDM signals).

The transport packet demultiplexer (TP Demux) (15030) separates the transport packet from the broadcast signal. Most particularly, the transport packet demultiplexer (TP Demux) (15030) performs the role of filtering a packet identifier.

The PSI/PSIP/SI processor (15040) processes signaling signals. For example, the PSI/PSIP/SI processor (15040) performs the role of processing multiple tables included in the PSIP or DVB SI or the role of processing signaling packets, signaling segments, and so on.

The 3D video decoder (15050) includes the primary video decoder (15052) and the secondary video decoder (15054).

The 3D video decoder (15050) decodes 3D video data.

The primary video decoder (15052) decodes primary video data. For example, when an MVC type coding method is applied to the video data, the primary video data may correspond to a signal of a base layer or an enhanced layer. In another example, the primary video decoder (15052) may perform the role of decoding left view image video data.

The secondary video decoder (15054) decodes secondary video data. For example, when an MVC type coding method is applied to the video data, the secondary video data may correspond to a signal of an enhanced layer or a base layer. In another example, the secondary video decoder (15054) may perform the role of decoding right view image video data.

The 3D OSD engine (15060) performs a processing operation for displaying OSD. For example, the 3D OSD engine (15060) translates the 3D depth information so as to determine the depth level at which an OSD of a specific service, program, event, and/or scene is to be displayed and to display the OSD accordingly. Thereafter, the 3D OSD engine (15060) processes the display of the OSD and controls the display of the OSD.

Among the images configuring the 3D video image, the left mixer (15070) processes the left view image.

Among the images configuring the 3D video image, the right mixer (15080) processes the right view image.

The 3D output formatter (15090) performs the role of displaying the left view image and the right view image, which configure the 3D video image. At this point, the 3D output formatter (15090) may also perform the role of displaying an OSD.

At least any one of the descriptors related to the above-described 3D depth is delivered by using a transport packet, and the corresponding descriptor(s) may be delivered by being included in the PMT, the TVCT, the EIT, and/or the SDT. In this case, the PSI/PSIP/SI processor (15040) performs the role of parsing at least any one of the descriptors related to the 3D depth and also performs the role of parsing the information included in the corresponding descriptor(s). The depth-associated information included in the at least any one of the descriptors related to the 3D depth is delivered to the 3D OSD engine (15060), so as to be used during the processing procedure for OSD display.

According to an embodiment of the present invention, the broadcast receiver performs the following procedure so as to perform the processing procedure for outputting a 3D OSD.

The receiver uses the 3D Depth Information Descriptor included in the PMT, the TVCT, or the SDT so as to determine the depth range information respective to the program, channel, or service that is currently being viewed.

The receiver then uses the EIT to determine the depth range information respective to an event that is to be broadcasted in the future.

When outputting graphics or OSD screens in accordance with user interaction or the performance of message or alarm functions, the receiver uses the depth range information determined in the above-described steps. More specifically, the receiver uses the min_disparity field value so as to decode the disparity according to which the OSD screen is to be located, within a range that the OSD screen does not overlay with the 3D video. For example, the receiver decides the OSD screen to be displayed in a location nearer to the user than the value designated by the min_disparity field.

In case the time point at which the OSD screen is to be outputted corresponds to an event boundary, during which a change occurs between two events, the receiver refers to the min_disparity field value of the current event and the min_disparity field value of the next event and, then, outputs the OSD screen based upon the min_disparity field value nearer the front (i.e., the smaller min_disparity field value). For example, based upon a timeout length of the OSD and a general user interaction, when it is assumed that the output period of an OSD screen is equal to approximately one minute, the receiver may use a method for checking whether or not an event change has occurred within the period of one minute.

According to another embodiment of the present invention, the broadcast receiver performs the following procedure so as to perform the processing procedure for outputting a 3D OSD.

The receiver uses the 3D Scene-level Depth Information Descriptor included in the PMT, the TVCT, or the SDT so as to determine the scene-level depth range information, i.e., the depth range information for each time period, respective to the program, channel, or service that is currently being viewed.

When the broadcast receiver receives this information by using the EIT, the corresponding descriptor may determine the depth range information for each time period corresponding to the time span of the EIT.

When outputting graphics or OSD screens in accordance with user interaction or the performance of message or alarm functions, the receiver uses the depth range information determined in the above-described steps. More specifically, the receiver uses the min_disparity field value so as to decode the disparity according to which the OSD screen is to be located, within a range that the OSD screen does not overlay with the 3D video. For example, the receiver decides the OSD screen to be displayed in a location nearer to the user than the value designated by the min_disparity field.

In case the time point at which the OSD screen is to be outputted corresponds to a scene boundary, during which a change occurs between two scenes, the receiver refers to the min_disparity field value of the current scene and the min_disparity field value of the next scene and, then, outputs the OSD screen based upon the min_disparity field value nearer the front (i.e., the smaller min_disparity field value). For example, based upon a timeout length of the OSD and a general user interaction, when it is assumed that the output period of an OSD screen is equal to approximately one minute, the receiver may use a method for checking whether or not a scene change has occurred within the period of one minute.

Figure 16:
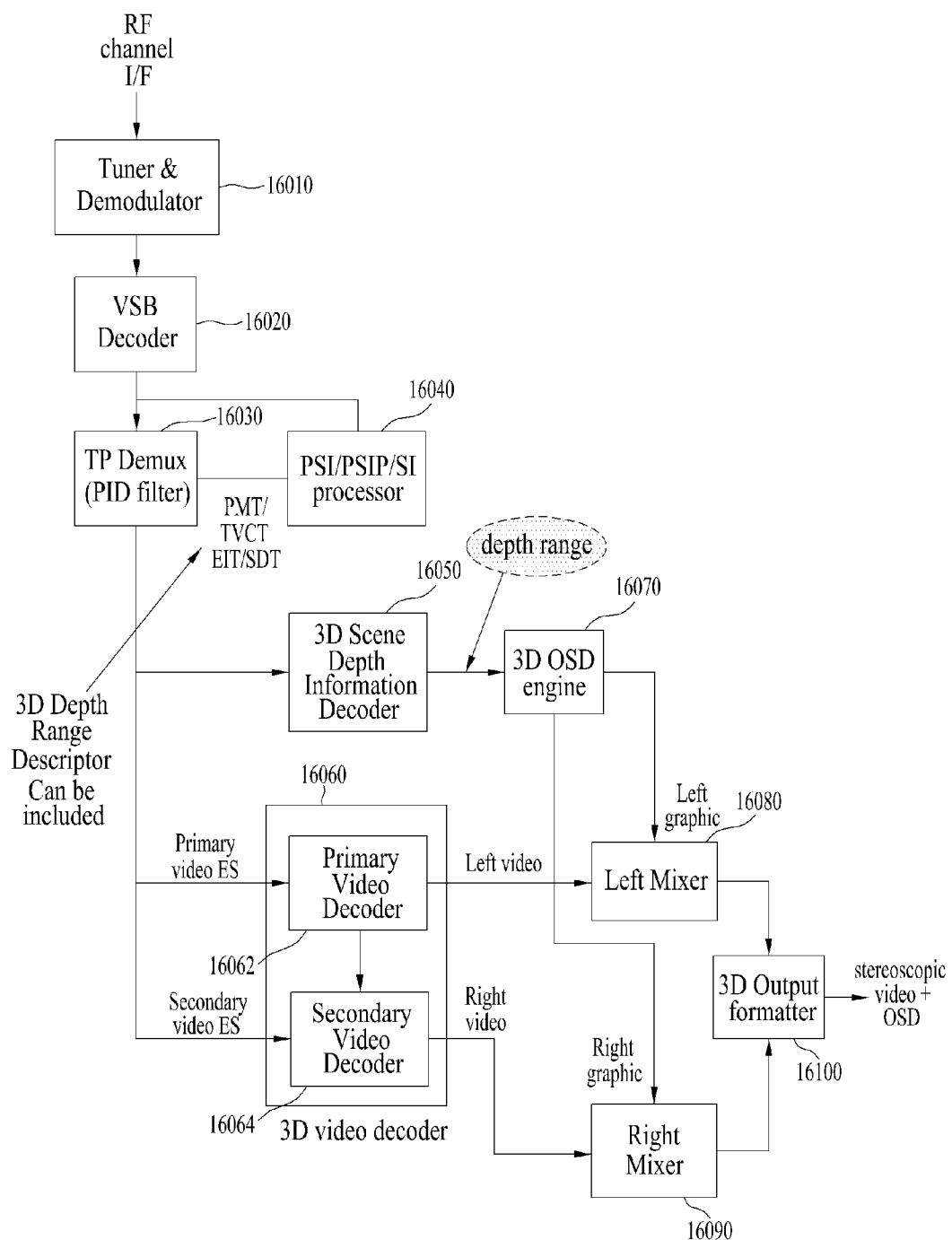
FIG. 16 illustrates a block view of a broadcast receiver for receiving and processing 3D video images according to another embodiment of the present invention.

FIG. 16 illustrates a block view of a broadcast receiver for receiving and processing 3D video images according to another embodiment of the present invention.

The broadcast receiver according to the embodiment of the present invention may include a Tuner & Demodulator (16010), a VSB decoder (16020), a transport packet demultiplexer (TP Demux) (16030), a PSI/PSIP/SI processor (16040), a 3D scene depth information decoder (16050), a 3D video decoder (16060), a primary video decoder (16062), a secondary video decoder (16064), a 3D OSD engine (16070), a left mixer (16080), a right mixer (16090), and/or a 3D output formatter (16100).

Most of the blocks shown in FIG. 6 perform the same role as the blocks having the same name shown in FIG. 15. Therefore, a detailed description of the same will be omitted for simplicity and may be replaced with the description given in FIG. 15.

The 3D scene depth information decoder (16050) decodes a 3D scene depth stream. In case the 3D scene depth information is delivered by using the PES, the 3D scene depth information decoder (16050) decodes the PES including the 3D scene depth information.

In this case, the 3D depth range descriptor may be included in the PMT, the TVCT, the EIT, and/or the SDT, thereby being delivered.

The 3D OSD engine (16070) uses the 3D scene depth information and the information included in the 3D depth range descriptor, so as to control a display depth of the PSD at an adequate time point.

According to yet another embodiment of the present invention, the broadcast receiver performs the following procedure so as to perform the processing procedure for outputting a 3D OSD.

The receiver determines whether or not a 3D Scene Depth Information stream for a program, channel, or service that is signaled by the PMT, the TVCT, or the SDT is included. Then, the receiver uses the 3D Depth Range Descriptor so as to determine the application time point of the depth range, which is provided by the 3D scene depth information stream, thereby determining whether or not an overlaying portion occurs in the corresponding stream and determining whether or not the receiver should receive the corresponding stream.

The receiver uses PID information respective to the 3D Scene Depth Information stream, so as to extract the corresponding stream, thereby allowing the 3D Scene Depth Information Decoder to determine the depth range information for each time period.

When outputting graphics or OSD screens in accordance with user interaction or the performance of message or alarm functions, the receiver uses the depth range information determined in the above-described steps. More specifically, the receiver uses the min_disparity field value so as to decode the disparity according to which the OSD screen is to be located, within a range that the OSD screen does not overlay with the 3D video. For example, the receiver decides the OSD screen to be displayed in a location nearer to the user than the value designated by the min_disparity field.

In case the time point at which the OSD screen is to be outputted corresponds to a scene boundary, the receiver refers to the min_disparity field value of the current scene and the min_disparity field value of the next scene and, then, outputs the OSD screen based upon the min_disparity field value nearer the front (i.e., the smaller min_disparity field value). For example, based upon a timeout length of the OSD and a general user interaction, when it is assumed that the output period of an OSD screen is equal to approximately one minute, the receiver may use a method for checking whether or not a scene change has occurred within the period of one minute.

Figure 17:
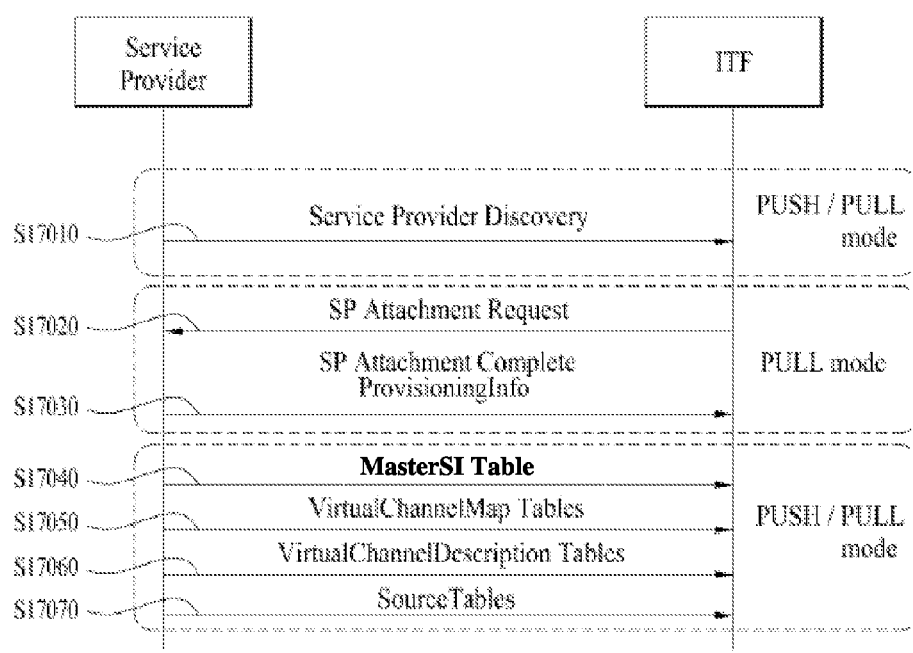
FIG. 17 illustrates a procedure for receiving (or acquiring) a 3D service in an IPTV according to an embodiment of the present invention.

FIG. 17 illustrates a procedure for receiving (or acquiring) a 3D service in an IPTV according to an embodiment of the present invention.

An ITF (IPTV Terminal Function) receives information for Service Provider Discovery from a service provider through a Push/Pull mode (s17010). Herein, Service Provider Discovery corresponds to a process performed by the service providers for finding a server that provides information on the services that they provide. For example, Service Provider Discovery provides a service information server for each service provider by using the following methods. More specifically, the receiver finds a list of addresses through which information on an SD Server (Service Discovery Server) (SP Discovery information) by using the following methods.

For example, the receiver receives SP (Service Provider) Discovery information from an address, which is automatically or manually predetermined in advance. At this point, the corresponding information may be received from an address predetermined in the ITF, or the user may manually set-up a specific address so as to receive the SP Discovery information wanted by the user.

In another example, the receiver may perform DHCP-based SP Discovery. More specifically, the receiver may use a DHCP option so as to receive (or acquire) SP Discovery information.

In yet another example, the receiver may perform DNS SRV-based SP Discovery. More specifically, the receiver may receive (or acquire) the SP Discovery information by sending a query using a DNS SRV mechanism.

Accordingly, the receiver accesses the server corresponding to the address received (or acquired) by using the above-described methods. Thereafter, the receiver receives information configured of a Service Provider Discovery Record, which carries the information required for Service Discovery of the SP (Service Provider). By using the information configured of the Service Provider Discovery Record, the receiver carries out a step of performing service search. Data related to may be provided in a Push format or a Pull format or any other data format.

Based upon the information on the SP Discovery record, the receiver accesses an SP Attachment Server respective to an access address of the service provider (e.g., an address designated to an SPAttachmentLocator), so as to carry out an ITF registration procedure (Service Attachment procedure) (s17020). At this point, for example, the information delivered to the server by the ITF may be delivered in an ITFRegistrationInputType record format, and the ITF may provide such information in a query Term format of an HTTP GET method, so as to perform Service Attachment.

According to the embodiment of the present invention, for example, the receiver may optionally access an Authentication service server of an SP, which is designated to the SPAuthenticationLocator, so as to perform a separate authentication procedure. Thereafter, the receiver may perform Service Attachement. In this case, the receiver may transmit ITF information having the same format as that used in the above-described Service Attachment process to the server, so as to perform the authentication procedure.

The receiver may receive data having a ProvisioningInfoTable format from a service provider (s17030). However, this process may also be omitted for simplicity.

The receiver may provide its own ID and location information in data, which are transmitted to the server during the Service Attachment procedure, such as an ITFRegistrationInputType record, and so on. Then, based upon the information provided by the receiver, the Service Attachment server may specify the service to which the receiver is subscribed. Thereafter, based upon this information, the Service Attachment server may provide the address from which the receiver can acquire (or receive) the Service Information, which the receiver is to receive, in a ProvisioningInfoTable format (s17040). For example, this address may be uses an access information of a MasterSI Table. Such method enables a service to be customized for each of the subscribed users and provided to the respective subscribed user.

Based upon the information received from the service provider, the receiver may receive a VirtualChannelMap Table (s17050), a VirtualChannelDescription Table (s17060), and/or a SourceTable (s17070).

The VirtualChannelMap Table provides a Master SI Table Record, which is configured for managing access information and version information, and a list of services in a package format. The VirtualChannelDescription Table carries detailed information on each channel. The SourceTable carries access information that can access an actual service. And, the VirtualChannelMap Table, the VirtualChannelDescription Table, and the SourceTable may be categorized as service information. Such service information may further include 3D depth related information, which is included in the above-described descriptor or PES. However, in this case, the format of the information may be modified so as to fit a service information scheme for IPTVs.

Figure 18:
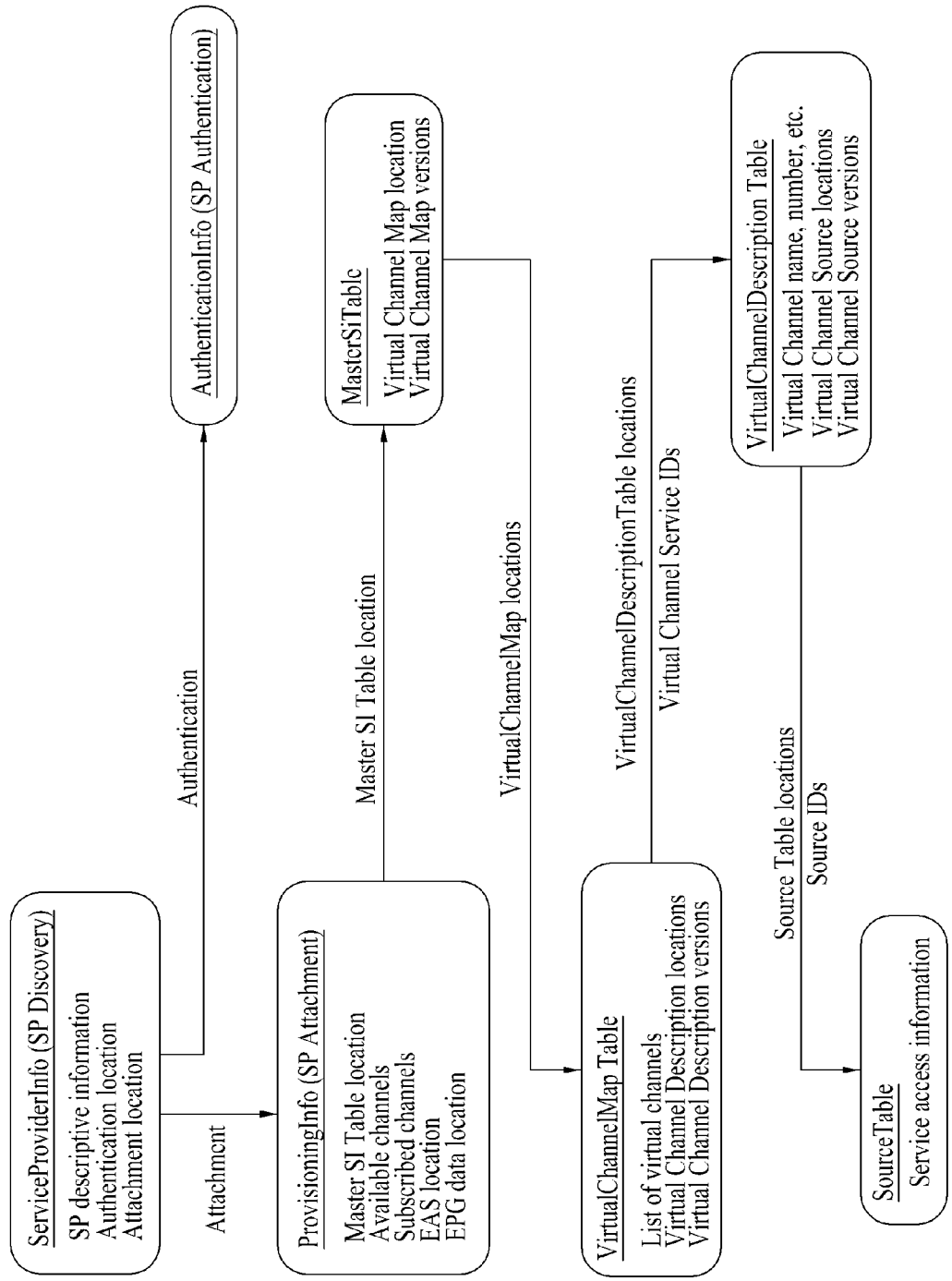
FIG. 18 illustrates a SI (Service Information) table structure for IPTVs according to an embodiment of the present invention.

FIG. 18 illustrates a SI (Service Information) table structure for IPTVs according to an embodiment of the present invention.

Herein, FIG. 18 illustrates Service Provider discovery, attachment metadata components, and Services Discovery metadata components and also illustrates the correlation between the Service Provider discovery, the attachment metadata components, and the Services Discovery metadata components. Herein, the receiver may process the received data by carrying out the process steps along the directions pointed by the arrows shown in FIG. 18.

ServiceProviderInfo includes SP descriptive information, which corresponds to information associated with the service provider, Authentication location information, which corresponds to information on a location that provides the information associated with authentication, and Attachment location information, which corresponds to information associated with an attachment location.

The receiver may use the Authentication location information, so as to perform authentication associated with the service provider.

The receiver may also use information included in the Attachment location, so as to access a server from which the receiver can receive ProvisioningInfo. The ProvisioningInfo may include Master SI Table location information, which includes an address of a server from which a Master SI Table can be received, Available channel information, which includes information on the channels that can be provided to the user, Subscribed channel information, which includes information related to a Subscribed channel, EAS (Emergency Alert System) location information, which includes information related to emergency situation alert, and/or EPG data location information, which includes location information related to an EPG (Electronic Program Guide). Most particularly, the receiver may use the Master SI Table location information, so as to access an address from which the receiver can receive the Master SI Table.

The Master SI Table Record carries information on the location from which the receiver can receive each VirtualChannelMap and also carries information on the version of each VitualChannelMap.

Each VirtualChannelMap is identified by a VirtualChannelMapIdentifier, and the VituralChannelMapVersion carries version information of the VictualChannelMap. Among all of the tables that are connected to one another along the direction of pointed by the arrows, starting from the MasterSITable, when one of the tables is modified, such modification may result in an increment in a version number of the corresponding table and may also result in an increment in version numbers of all tables hierarchically higher than the corresponding table (up to the MasterSI table). Therefore, by monitoring the MasterSITable a change in the overall SI tables may be immediately recognized. For example, when a change occurs in the SourceTable, such change may increment the value of the SourceVersion, which correspond to the version information of the SourceTable, and such change may also result in a change in a VirtualChannelDescriptionTable, which includes a reference on the SourceTable. As described above, a change in a lower-level table is propagated to higher-level tables, thereby bringing about a change in the MasterSITable.

Only one Master SI Table may exist for one service provider. However, in case the service configuration is different for each regional area or subscribed user (or subscribed user group), it may be more efficient to configure a separate Master SI Table Record for each service configuration in order to provide customized services for each service unit. In this case, the customized service best-fitting the information on the user's subscribed location and the user's subscription information may be provided through a Master SI table during the Service Attachment process.

The Master SI Table Record provides a VitrualChannelMap list. The VitrualChannelMap may be identified by a VirtualChannelMapIdentifier. Each VirtualChannelMap may have at least one or more VirtualChannels, and the VirtualChannelMap designates a location from which detailed information on each VirtualChannel can be acquired (or received). VirtualChannelDescriptionLocation performs the role of designating the location of a VirtualChannelDescriptionTable, which carries detailed channel information.

The VirtualChannelDescriptionTable carries detailed information on the VirtualChannel, and the VirtualChannelDescriptionTable may access a location that provides the corresponding information to the VirtualChannelDescriptionLocation within the VirtualChannelMap.

VirtualChannelServiceID is included in the VirtualChannelDescriptionTable, and the VirtualChannelServiceID performs the role of identifying a service the corresponds to VirtualChanneldescription. The receiver may find the VirtualChannelDescriptionTable by using the VirtualChannelServiceID. In case the receiver receives multiple VirtualChannelDescriptionTables through a Multicast method, the receiver may join the corresponding stream so as to continue to receive the transmitted tables, thereby finding the VirtualChannelDescriptionTable that is identified by a specific VirtualChannelServiceID.

In case of the Unicast method, the receiver may deliver the VirtualChannelServiceID to the server as a parameter and may then receive only the wanted VirtualChannelDescriptionTable.

The SourceTable provides access information (e.g., IP address, port, AV codec, transmission protocol, and so on), which is required for actually accessing a service, and/or Source information for each service. Since one Source may be used for multiple VirtualChannel services, it will be efficient to divided the Source information for each service and provide the divided Source information to the respective service.

The above-described MasterSITable, VirtualChannelMapTable, VirtualChannelDescriptionTable, and SourceTable are divided through four logically separated flows, and, herein, any one of the Push/Pull methods may be used.

However, the MasterSITable may be transmitted by the multicast method in order to manage the version. And, the receiver may always receive the stream that transmits the MasterSITable so as to monitor the change in version.

Figure 19:
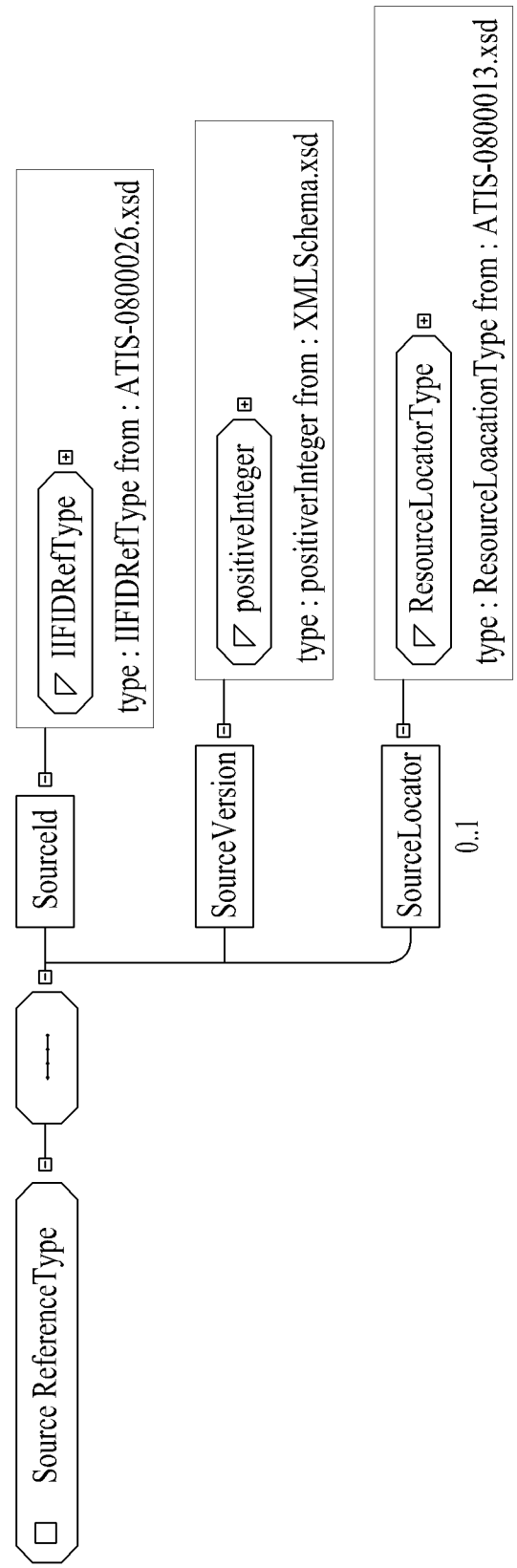
FIG. 19 illustrates an XML schema of a SourceReferenceType according to an embodiment of the present invention.

FIG. 19 illustrates an XML schema of a SourceReferenceType according to an embodiment of the present invention.

According to the embodiment of the present invention, the XML schema of the SourceReferenceType corresponds to a structure that refers to a source element, which carries media source information of a Virtual Channel Service.

SourceReferenceType includes SourceId information, SourceVersion information, and/or SourceLocator information.

SourceId corresponds to an identifier of the referenced Source element.

SourceVersion corresponds to a version of the referenced Source element.

SourceLocator provides a location wherein a Source Table including the referenced Source element can be received. For example, in case a DefaultSourceLocator and the Source element exist at the same time, the Source element overrides the default value.

Figure 20:
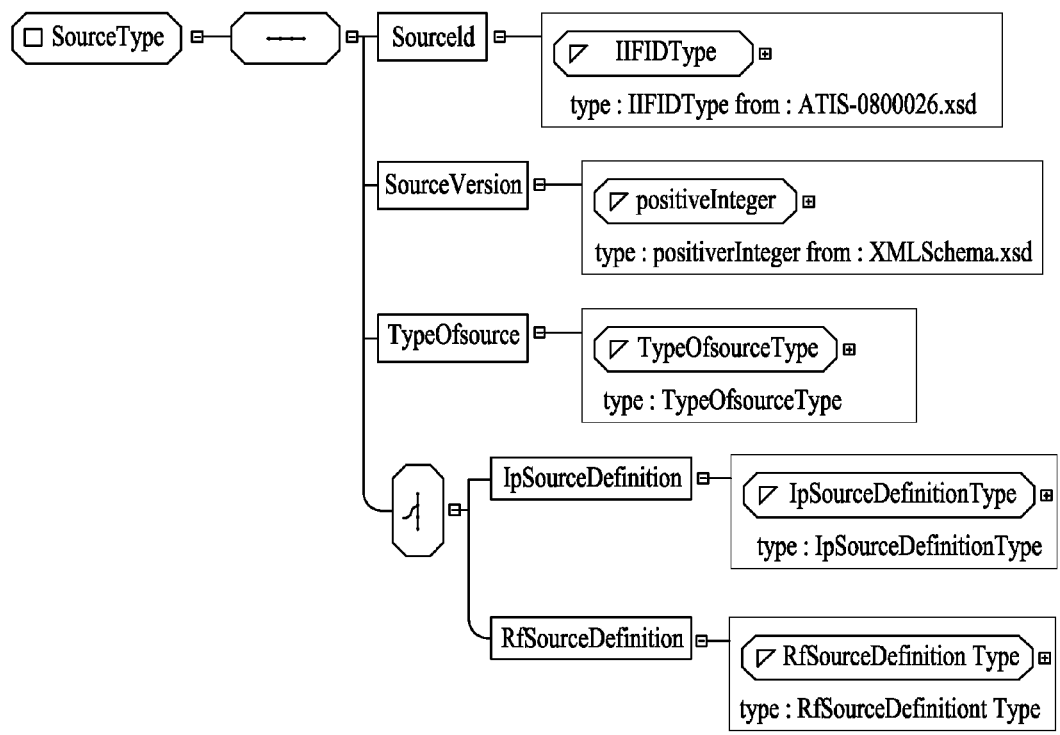
FIG. 20 illustrates an XML schema of a SourceType according to an embodiment of the present invention.

FIG. 20 illustrates an XML schema of a SourceType according to an embodiment of the present invention.

According to the embodiment of the present invention, the XML schema of the SourceType carries information required for acquiring media source of a VirtualChannelService.

SourceType includes SourceId information, SourceVersion information, TypeOfSource information, IpSourceDefinition information, and/or RfSourceDefinition information.

SourceId corresponds to an identifier of the referenced Source element. For example, the identifier should be capable of uniquely identifying this Source element.

SourceVersion corresponds to a version of the referenced Source element. For example, the value of the SourceVersion shall be incremented each time the content of the Source element is changed, altered or modified.

TypeOfSource corresponds to a value indicating the nature of the corresponding Source. For example, the TypeOfSource may indicate the nature of the corresponding Source, such as HD (High Definition), SD (Standard Definition), PIP (Picture in Picture), Barker, and so on.

More specifically, for example, a Barker channel corresponds to a channel designated for advertisement or publicity. Therefore, in case the user is not given the authority for viewing a selected channel and is, therefore, unable to view the corresponding selected channel, the Barker channel is automatically selected. Accordingly, the Barker channel performs the role of advertising the channel selected by the user and providing subscription guidance to the user for viewing the wanted channel.

IpSourceDefinition provides access information of the media source, which is delivered through an IP network. For example, the IpSourceDefinition may notify a Multicast IP address, a transmission protocol, and/or various parameters.

RfSourceDefinition provides access information of the media source, which is delivered through a cable TV network.

FIG. 21 illustrates an extended TypeOfSourceType XML Schema for the 3D Scene Depth information according to an embodiment of the present invention.

According to the embodiment of the present invention, in order to signal the 3D Scene Depth information, the TypeOfSource may be extended so that the broadcast receiver can identify the 3D Scene Depth information as information related to 3D depth.

For example, according to the embodiment of the present invention, 3DSceneDepthInformation, which is included in the extended TypeOfSource, represents a source for transmitting asynchronous depth information, which corresponds to 3D depth related information. Reference may be made to the description provided above for the detailed description of the asynchronous depth information, and, therefore, the detailed description of the same will be omitted for simplicity.

Also, according to the embodiment of the present invention, in order to provide 3D depth information for each source, IPSourceDefinition and RFSourceDefinition may be extended as described below. Providing information during this process step may be considered to be similar to providing channel-level or service-level 3D Depth information, in case of ATSC or DVB broadcasting. In IPTVs, a single service may be configured of multiple media sources. And, therefore, as a flexible structure, which is described above, a service may be designed to designate multiple sources. Accordingly, by extending the Source-level information and by providing 3D Depth information, service-level information may be provided.

Figure 22:
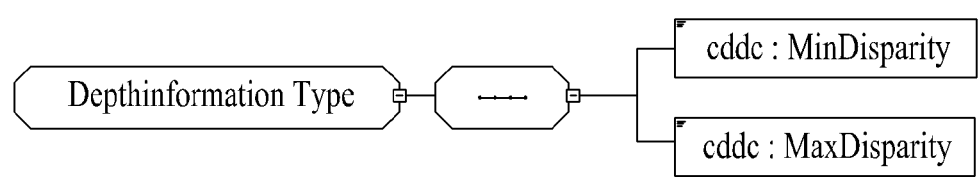
FIG. 22 illustrates a DepthInformationType XML Schema diagram for carrying 3D Depth information according to an embodiment of the present invention.

FIG. 22 illustrates a DepthInformationType XML Schema diagram for carrying 3D Depth information according to an embodiment of the present invention.

As described above, in order to carry the 3D Depth information, the DepthInformationType according to the embodiment of the present invention may include a Min disparity and a Max Disparity of the Depth information of the respective source of a provided service. The methods for interpreting and using such values are identical to the methods described above.

An IPTV service uses an IPTV structure than can provide diverse sources for the same service. Thus, it may be considered in IPTV services to provide multiple sources having different Depth Ranges in the same 3D service. In this case, the receiver may select a source having a depth corresponding to a depth level predetermined by the user, or the receiver may select a source having a Depth Range that can be best expressed (or displayed) by the receiver, thereby being capable of using the corresponding service.

FIG. 23 illustrates a DepthInformationType XML Schema for carrying the 3D Depth information according to an embodiment of the present invention.

As described above, the DepthInformationType may include a Minimum disparity value and a Maximum disparity value. These values may be expressed as integers.

Figure 24:
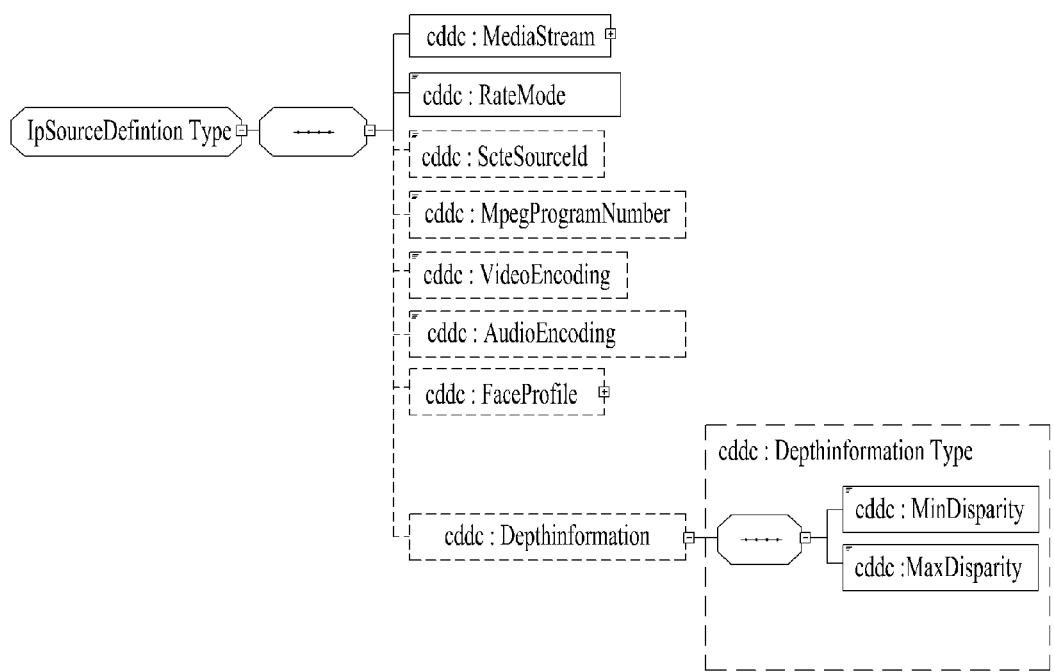
FIG. 24 illustrates an extended IpSourceDefinitionType XML Schema for carrying the 3D Depth information according to an embodiment of the present invention.

FIG. 24 illustrates an extended IpSourceDefinitionType XML Schema for carrying the 3D Depth information according to an embodiment of the present invention.

According to the embodiment of the present invention, the IpSourceDefinitionType includes a MediaStream element, a RateMode element, a ScteSourceId element, an MpegProgramNumber element, a VideoEncoding element, an AudioEncoding element, an FecProfile element, and/or a DepthInformation element.

MediaStream element includes an IP multicast session description for the media stream for this source. This MediaStream element shall include the asBandwidth attribute. The units of the asBandwidth attribute shall be kilobits per second. The interpretation of the asBandwidth attribute shall be peak bitrate.

RateMode element includes Programming Source Rate Type ((Constant Bit Rate (CBR) or Variable Bit Rate (VBR))

ScteSourceId element includes Source ID that appears in the MPEG-2 transport stream.

MpegProgramNumber element includes MPEG Program Number.

VideoEncoding element, when present, shall indicate the video encoding format of this media source.

AudioEncoding element, when present, shall be a description of the Audio Coding used on this Programming Source, in the form of an audio MIME type registered with IANA.

FecProfile element indicates IP FEC Profile if available.

DepthInformation element includes information related to 3D Depth for each source. 3D Depth associated information, which is included in the above-described descriptor, may be optionally included in the DepthInformation element.

For example, according to the embodiment of the present invention, when the 3D Scene Depth information is provided by using a 3D media stream and a separate stream, 3D depth related information may be signaled to a Source corresponding to 3DSceneDepthInformation, which is included in the above-described Source Type. In this case, the receiver may receive a 3D service source carrying an AV stream of the 3D service, and a source carrying 3D Depth information at the same time. Then, based upon the received sources, the receiver may be capable of positioning the OSD at an adequate location, while the user is viewing the 3D broadcast program. In this case, the 3D Depth information that is provided by the separate stream may be accumulated in the form of an IP packet, which is similar to when the 3D Depth information is transmitted in a PES format through a MPEG-2 TS, thereby being delivered. In another method, the format of the 3D Depth information may be defined as an XML format, thereby being transmitted as an XML document.

In addition to the above-described method of providing 3D Depth information through a signaling scheme of an IPTV, since IPTV media are configured of an MPEG-2TS format, which is similar to the format of the conventional digital broadcasting media, thereby being transmitted through an IP network, the 3D Depth information may also be provided through diverse tables in the above-described SI end or through a separate ES.

Figure 25:
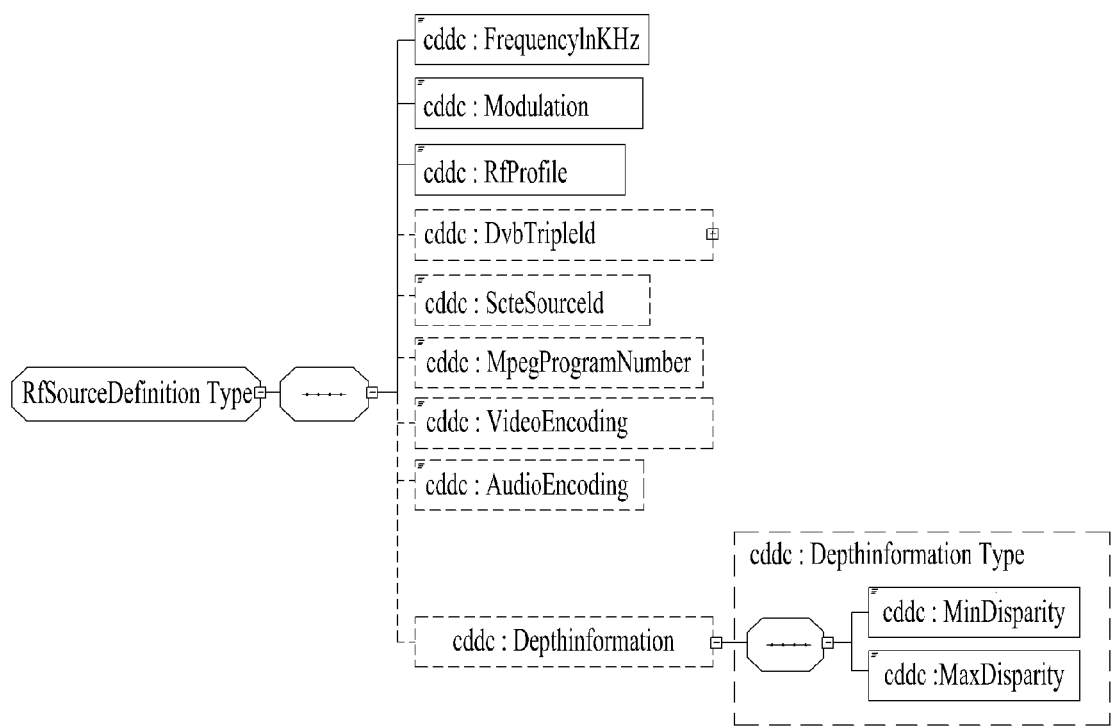
FIG. 25 illustrates an extended RfSourceDefinitionType XML Schema for carrying the 3D Depth information according to an embodiment of the present invention.

FIG. 25 illustrates an extended RfSourceDefinitionType XML Schema for carrying the 3D Depth information according to an embodiment of the present invention.

According to the embodiment of the present invention, the RfSourceDefinitionType includes a FrequencyInKHz element, a Modulation element, an RfProfile element, a DvbTripleId element, a ScteSourceId element, an MpegProgramNumber element, a VideoEncoding element, an AudioEncoding element, and/or a DepthInformation element.

FrequencyInKHz element indicates RF frequency of the source in KHz. This shall be the center frequency regardless of the modulation type.

Modulation element shall indicate the RF Modulation Type. The allowable modulation types are NTSC, QAM-64, QAM-256, or 8-VSB.

RfProfile element shall indicate the basic stream format. The allowable profile values are SCTE, ATSC, or DVB.

DvbTripleId element is a DVB Triplet identifier for a broadcast stream.

ScteSourceId element is a Source ID that appears in the MPEG-2 transport stream.

MpegProgramNumber element indicates MPEG-2 Program Number.

VideoEncoding element, when present, shall be a description of the Video Coding used on this Programming Source.

AudioEncoding element, when present, shall be a description of the Audio Coding used on this Programming Source.

DepthInformation element includes information related to 3D Depth for each source. 3D Depth associated information, which is included in the above-described descriptor, may be optionally included in the DepthInformation element.

The method for signaling the 3D depth associated information is similar to the method and/or description shown in FIG. 24. Therefore, a detailed description of the same will be omitted for simplicity.

Figure 26:
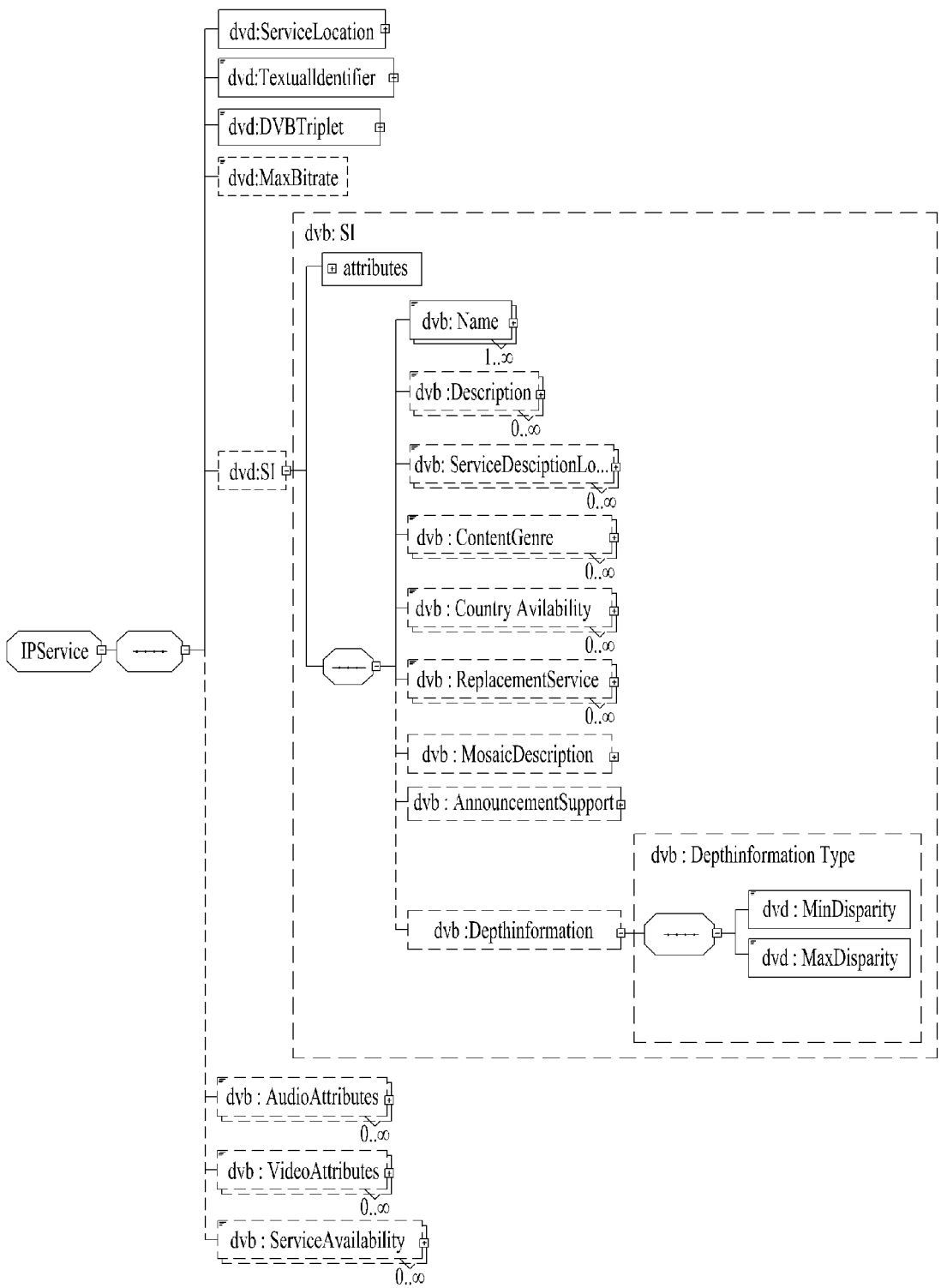
FIG. 26 illustrates an IpService XML Schema that is extended in order to carry 3D depth information according to an embodiment of the present invention.

FIG. 26 illustrates an IpService XML Schema that is extended in order to carry 3D depth information according to an embodiment of the present invention.

According to the embodiment of the present invention, IpService includes ServiceLocation information, TextualIdentifier information, DVBTriplet information, MaxBitrate information, SI information, VideoAttributes information, AudioAttributes information, and/or ServiceAvailabilty information.

ServiceLocation information indicates the locations at which the service can be found.

TextualIdentifier information indicates the Textual identifier by which the service is known. If the domain name is missing, it is taken from the context.

DVBTriplet information indicates the DVB Triplet by which the service is known. This will match the service details inside the transport stream.

MaxBitrate information indicates the peak bitrate (in kbits/s) at which the transport stream carrying the service will operate.

SI information includes Service information about the service carried.

The SI information includes Name information, Description information, ServiceDescriptionLocation information, ContentGenre information, CountryAvailability information, ReplacementService information, MosaicDescription information, AnnouncementSupport information, and/or DepthInformation information.

The Name information specifies the text form of the name by which the service is known to the user.

The Description information specifies a textual description of the service.

The ServiceDescriptionLocation information specifies the identifier(s) of the BCG Record(s) for the BCG Discovery element that carries the information on this offering.

The ContentGenre information specifies the (primary) genre of the service.

The CountryAvailability information specifies the list of countries in which the service is, or is not, available.

The ReplacementService information specifies details the linkage to a service that can be used in case of a failure of the service to which this SI record refers.

The MosaicDescription information specifies details of the services, or service packages, which are displayed in a mosaic stream.

The AnnouncementSupport information specifies the announcements supported by the service, and linkage information as to their location.

DepthInformation element includes information related to 3D Depth for each source. 3D Depth associated information, which is included in the above-described descriptor, may be optionally included in the DepthInformation element.

For example, in order to extend a DVB IPTV standard and to use the extended DVB IPTV standard, the DepthInformation information is included in the SI information of the extended IPService, thereby enabling the 3D Depth related information to be provided.

In a DVB IPTV, each IPTV service is expressed in IPService-levels within a DVB SD&S. And, herein, the SI information provides additional detailed information on the corresponding service. Such information may identically provide most of the information content included in the SDT of the DVB SI. By extending the SI information and adding DepthInformation information, the 3d Depth information that can be used for each service by providing the processed information may be provided.

As described above, the DVB IPTV may also be configured in the MPEG2 TS format, and by transmitting this through an IP network, the DVB SI information within the TS may be used in the same format as the convention DVB broadcasting content. In this case, the above-described methods for signaling 3D depth related information may be used.

The VideoAttributes information specifies each instance of this value specifies a way of coding the video that may be used at some point during the operation of the service.

The AudioAttributes information specifies each instance of this value specifies a way of coding the audio that may be used at some point during the operation of the service.

The ServiceAvailabilty defines the geographical regions in which this service is available, or not available.

Figure 27:
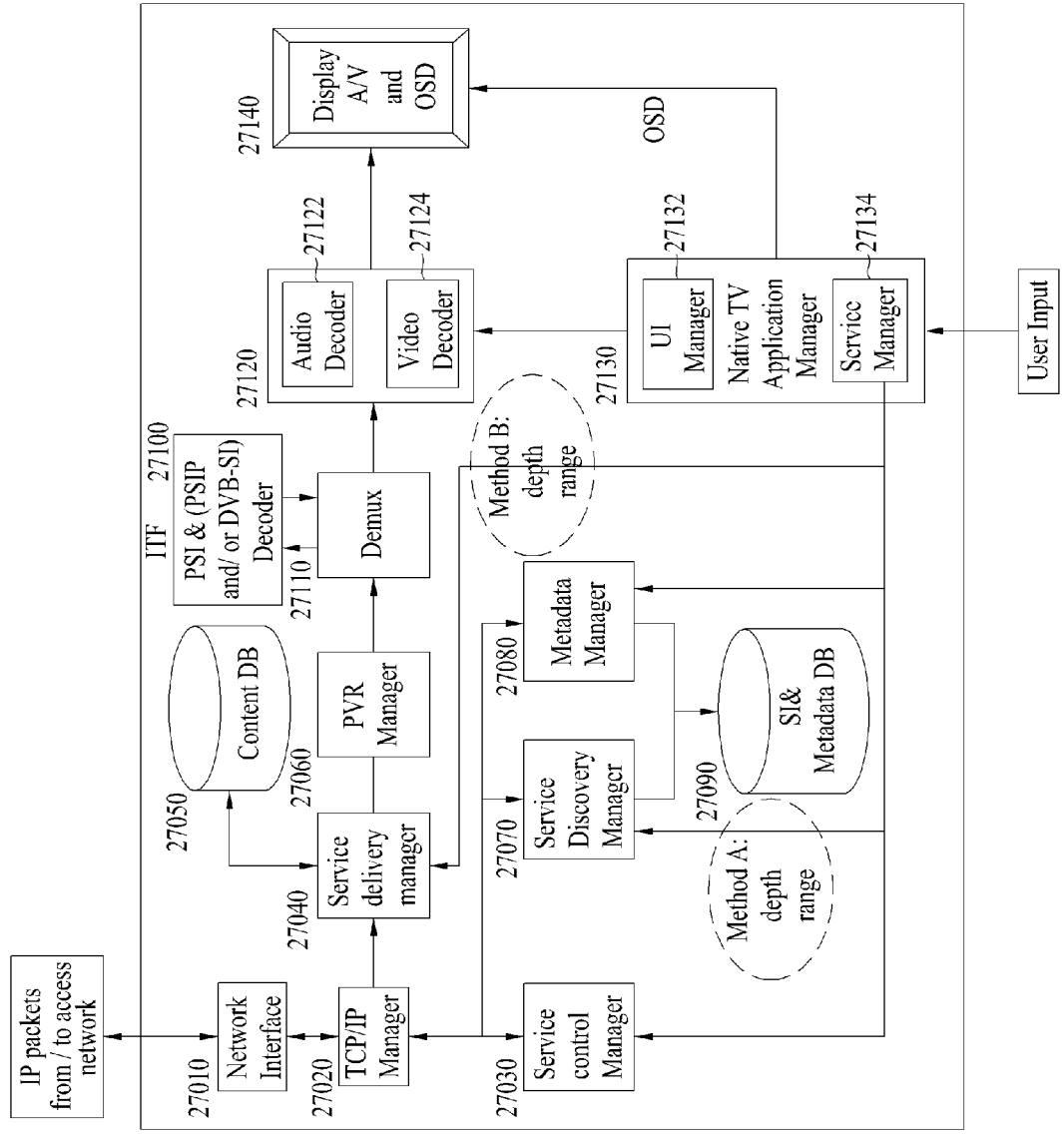
FIG. 27 illustrates an IPTV receiver according to an embodiment of the present invention.

FIG. 27 illustrates an IPTV receiver according to an embodiment of the present invention.

According to the embodiment of the present invention, the IPTV receiver includes a Network Interface (27010), a TPC/IP Manager (27020), a Service Control Manager (27030), a Service Delivery Manager (27040), a Content DB (27050), a PVR manager (27060), a Service Discovery Manager (27070), a Service Manager (27080), a SI & Metadata DB (27090), a PSI & (PSIP and/or DVB-SI) Decoder (27100), a DEMUX (27110), an Audio and Video Decoder (27120), a Native TV Application manager (27130), and/or an A/V and OSD Displayer (27140).

The Network Interface (27010) performs the role of transmitting/receiving an IPTV packet. The Network Interface (27010) operates in a physical layer and/or in a data link layer.

The TPC/IP Manager (27020) is involved in end to end packet transmission. More specifically, the TPC/IP Manager (27020) performs the role of managing packet transmission from source to destination. The TPC/IP Manager (27020) performs the role of distributing the IPTV packets to the appropriate managers, thereby transmitting the distributed IPTV packets.

The Service Control Manager (27030) performs the role of selecting a service and controlling the selected service. The Service Control Manager (27030) may also perform the role of managing sessions. For example, the Service Control Manager (27030) may use an IGMP (Internet Group Management Protocol) or an RTSP, so as to select a real-time broadcast service. For example, the Service Control Manager (27030) may use the RTSP to select VOD (Video on Demand) contents. For example, when an IMS (IP Multimedia Subsystem) is used, the Service Control Manager (27030) uses an SIP (session initiation protocol) so as to perform session initialization and/or management via an IMS gateway. RTSP protocol can be used in controlling of the delivery of broadcast TV and audio as well as for on-demand delivery. RTSP protocol uses a persistent TCP connection and allows trick mode control on real-time media streaming.

The operation of the Service Delivery Manager (27040) relates to real-time streaming and/or handling content download. The Service Delivery Manager (27040) retrieves contents from the Content DB (27050) for future usage. The Service Delivery Manager (27040) may use a Real-Time Transport Protocol (RTP)/RTP Control Protocol (RTCP), which are used along with the MPEG-2 Transport Stream (TS). In this case, the MPEG-2 packet is encapsulated by using the RTP. The Service Delivery Manager (27040) parses the RTP packet and then transmits the parsed packet to the DEMUX (27110). The Service Delivery Manager (27040) may use the RTCP so as to perform the role of transmitting a feedback on a network reception. Without using the RTP, the MPEG-2 Transport packets may be directly transmitted by using a UDP (user datagram protocol). In order to perform contents downloading, the Service Delivery Manager (27040) may use an HTTP (hypertext transfer protocol) or a FLUTE (File Delivery over Unidirectional Transport) as the transmission protocol. The Service Delivery Manager (27040) may perform the role of processing a stream, which transmits the 3D depth related information. More specifically, when the above-described 3D depth related information is transmitted through a stream, the processing of the 3D depth related information may be performed by the Service Delivery Manager (27040).

Content DB (27050) is a database for Contents which may be delivered by content download system or may be recorded from live media TV.

PVR manager (27060) is responsible for recording and/or playing live streaming contents, and gathering all the necessary metadata of the recorded content, and/or generating additional information for better user experience (e.g. thumbnail image, index etc).

Service Discovery Manager (27070) is enabling of the discovery of IPTV services over bi-directional IP network. Service Discovery Manager (27070) provides all the information for selecting service.

Metadata Manager (27080) manages the processing of metadata.

SI & Metadata DB (27090) is a database for Service Discovery information and Metadata related to the services.

PSI & (PSIP and/or DVB-SI) Decoder (27100) is a PSI (and PSIP/DVB-SI) Control Module. PSI & (PSIP and/or DVB-SI) Decoder (27100) sets PIDs for PSI tables and PSIP/DVB-SI tables to DEMUX. PSI & (PSIP and/or DVB-SI) Decoder (27100) decodes the private sections of PSI and (PSIP and/or DVB-SI) sent by DEMUX. The decoding result is used to de-multiplex input transport packets. (e.g set Audio and Video PID to DEMUX.)

DEMUX (27110) is configured to de-multiplex audio, video and/or PSI tables from input transport packets. DEMUX (27110) is controlled for the de-multiplexing for PSI tables by PSI Decoder. DEMUX (27110) is configured to make the sections of PSI tables and sending them to PSI Decoder. DEMUX (27110) is controlled for the de-multiplexing for A/V transport packets.

The Audio and Video Decoder (27120) may decode audio and/or video elementary stream packets. Herein, the Audio and Video Decoder (27120) may include an Audio Decoder (27122) and/or a Video Decoder (27124). The Audio Decoder (27122) decodes audio elementary stream packets. And, the Video Decoder (27124) decodes video elementary stream packets.

The Native TV Application manager (27130) includes a UI Manager (27132) and/or a Service Manager (27134). The Native TV Application manager (27130) supports a Graphic User Interface within a TV screen. The Native TV Application manager (27130) may receive a user key, which is inputted through a remote controller or a front panel. The Native TV Application manager (27130) may manage the status of the TV system. The Native TV Application manager (27130) may perform the role of configuring a 3D OSD and the role of controlling the output of the 3D OSD.

The UI Manager (27132) may perform the role of controlling the IPTV receiver so as to display a User Interface on the TV screen.

The Service Manager (27134) performs the role of controlling managers related to services. For example, the Service Manager (27080) may control the Service Control Manager (27030), the Service Delivery Manager (27040), an IG-OITF client, the Service Discovery Manager (27070), and/or the Metadata manager (27080). The Service Manager (27134) processes the 3D depth related information and control the display of the 3D OSD. For example, the Service Manager (27134) may process the 3D depth related information, and, then, the Service Manager (27134) may deliver the processed result to the UI Manager (27132). The UI Manager (27132) uses the 3D depth related information, which is delivered from the Service Manager (27134), so as to control the output of the 3D OSD.

The A/V and OSD Displayer (27140) receives audio data and video data and then controls the display of the video data and the playing of the audio data. The A/V and OSD Displayer (27140) controls the output of the OSD. In case of the 3D service, the A/V and OSD Displayer (27140) may perform the function of a 3D Output Formatter, which receives left view and right view images and outputs the received left view and right view images as a Stereoscopic video. During this process, the 3D OSD may also be outputted along with the Stereoscopic video.

Figure 28:
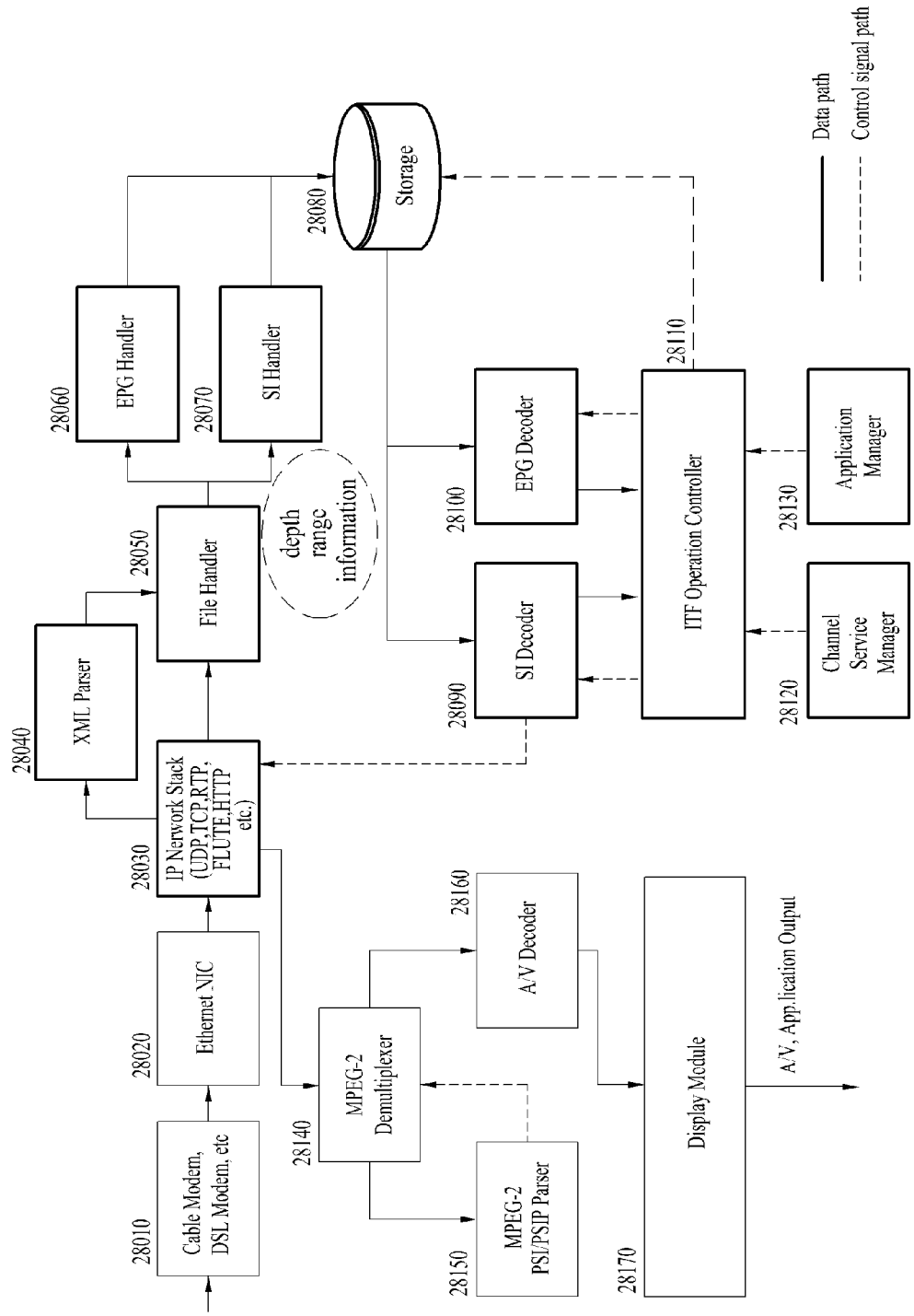
FIG. 28 illustrates functional blocks of an IPTV receiver according to an embodiment of the present invention.

FIG. 28 illustrates functional blocks of an IPTV receiver according to an embodiment of the present invention.

The functional blocks of the IPTV receiver according to the embodiment of the present invention may include a cable modem, a DSL modem (28010), an Ethernet NIC (Ethernet NIC, 28020), an IP network stack (28030), an XML parser (28040), a file handler (28050), an EPG handler (28060), an SI handler (28070), a storage device (28080), an SI decoder (28090), an EPG decoder (28100), an ITF operation controller (28110), a channel service manager (28120), an application manager (28130), an MPEG-2 demultiplexer (28140), an MPEG-2 PSI/PSIP parser (28150), an audio/video decoder (28160), and/or a display module (28170).

Herein, the blocks that are mostly used in the present invention are marked in bold lining, and the straight-lined arrows indicate the Data path, and the dotted-lined arrows indicate Control signal path. Hereinafter, each block will now be described in detail.

The cable modem, the DSL modem (28010) demodulates a signal that is transmitted through an interface, through which an ITF is connected to an IP network in a physical layer, or through physical medium, thereby recovering a digital signal.

The Ethernet NIC (Ethernet NIC, 28020) corresponds to a module recovering a signal, which is received through a physical interface, to IP data.

The IP network stack (28030) corresponds to a processing (or handling) module of each layer according to the IP protocol stack.

Among the received IP data, the XML parser (28040) parses XML documents.

Among the received IP data, the file handler (28050) handles (or processes) data that are transmitted in a file format through the FLUTE.

Among the data received in a file format, the EPG handler (28060) handles (or processes) a portion corresponding to IPTV EPG data and stores the processed data in the storage device (18080).

Among the data received in a file format, the SI handler (28070) handles (or processes) a portion corresponding to IPTV SI data and stores the processed data in the storage device (18080).

The storage device (28080) corresponds to a storage device configured to store data that require storage, such as SI, EPG, and so on.

When Channel Map information is required, the SI decoder (28090) retrieves the SI data from the storage device (18080), so as to analyze the retrieved data and to recover the required information.

When EPG information is required, the EPG decoder (28100) retrieves the EPG data from the storage device (18080), so as to analyze the retrieved data and to recover the required information.

The ITF operation controller (28110) corresponds to a main controller that can control the operations of the ITF, such as channel change, EPG display, and so on.

The channel service manager (28120) corresponds to a module that receives input from the user and manages the operation of changing channels.

The application manager (28130) corresponds to a module that receives input from the user and manages application services, such as EPG display.

The MPEG-2 demultiplexer (28140) corresponds to a module that extracts MPEG-2 transmission stream data from the received IP datagram and that delivers the extracted MPEG-2 transmission stream data to module respective to each PID.

The MPEG-2 PSI/PSIP parser (28150) corresponds to a module that can extract PSI/PSIP data, which carry information enabling access to a program element, such as PID information for each set of data (audio/video data, and so on) of the MPEG-2 transmission stream within the received IP datagram, and that can parse the extracted PSI/PSIP data.

The audio/video decoder (28160) corresponds to a module that can decode the received audio data and video data and that can deliver the decoded audio/video data to the display module.

The display module (28170) combines the received AV signal and OSD signal and processes (or handles) the combined signal, so that processed signal can be outputted to the screen and through a speaker. Also, in case of a 3D video, the display module (28170) performs the function of dividing the image into L/R images and outputting the divided L/R images as a 3D image (or video) through a formatter. Furthermore, by using the 3D depth related information, the display module (28170) may also perform the function of processing (or handling) the OSD, so that the OSD can be displayed along with the 3D image (or video).

Figure 29:
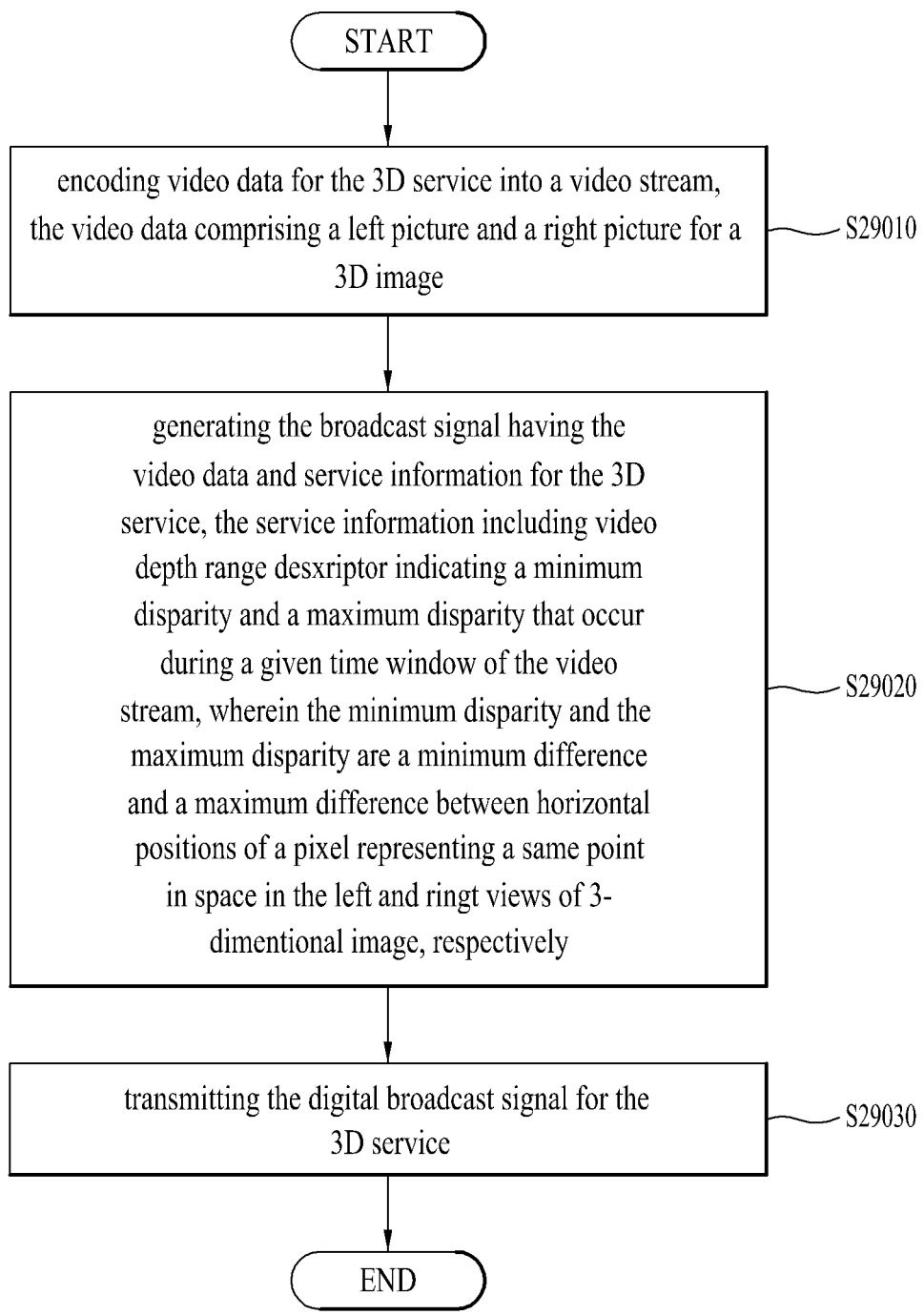
FIG. 29 illustrates a flow chart showing a method for processing 3D broadcast signals according to an embodiment of the present invention.

FIG. 29 illustrates a flow chart showing a method for processing 3D broadcast signals according to an embodiment of the present invention.

The broadcast transmitter encodes video data configured for 3D service into a video stream (s29010). Herein, the video data include a left picture and a right picture for the 3D image.

The broadcast transmitter generates a digital broadcast signal including the video data and the service information for 3D services (s29020). Service information includes video depth range descriptor indicating a minimum disparity and a maximum disparity that occur during a given time window of the video stream. Wherein the minimum disparity and the maximum disparity are a minimum difference and a maximum difference between horizontal positions of a pixel representing a same point in space in the left and right views of 3-dimensional image, respectively. For example, according to an embodiment of the present invention, the disparity may indicate value that is equally applied to both the left image (or picture) and the right image (or picture). According to another embodiment of the present invention, ½ of the disparity value may be applied to the left image (or picture) and the right image (or picture). Thus, the disparity value may become a value that indicates a difference in position between the left/right images and the 3D image.

The broadcast transmitter transmits a digital broadcast signal for 3D services (s29030).

According to the present invention, in a 3D service environment, a conflict between the display of an OSD, which is decided by the receiver, and the display of a 3D image.

Additionally, the present invention may prevent a conflict, which can occur at an event boundary, when providing event-level depth information, from occurring between the depth of a graphic object and the depth of a video object.

Furthermore, the present invention may prevent a depth conflict, which can occur at a scene boundary, when providing scene-level depth information, and when an OSD is displayed on a 3DTV, from occurring between the graphic object and the video object.

Although the present invention has been described in conjunction with the limited embodiments and drawings, the present invention is not limited thereto. Those skilled in the art will appreciate that various modifications, additions and substitutions are possible from this description. Therefore, the scope of the present invention should not be limited to the description of the exemplary embodiments and should be determined by the appended claims and their equivalents.

MODE FOR INVENTION

Various embodiments have been described in the best mode for carrying out the invention.

INDUSTRIAL APPLICABILITY

As described above, the present invention is partially or wholly applied to a digital broadcast system.

The invention claimed is:

1. An apparatus for receiving a digital broadcast signal for a 3-dimensional (3D) service, the apparatus comprising:
   a receiving unit configured to receive the broadcast signal having video data and service information for the 3D service, the video data being encoded for the 3D service into a video stream, the video data comprising a left picture and a right picture for a 3D image, the service information including video depth range descriptor indicating a minimum disparity and a maximum disparity that occur during a given time window of the video stream,
   wherein the minimum disparity and the maximum disparity are a minimum difference and a maximum difference between horizontal positions of a pixel representing a same point in space in the left and right views of 3-dimensional image, respectively;
   a signaling processor configured to parse the video depth range descriptor;
   a decoder configured to decode the video data; and
   a displaying processor configured to control on screen display (OSD) menu of the apparatus to be displayed on outer range of range between the minimum disparity and the maximum disparity of the video depth range descriptor,
   wherein the signaling processor is further configured to parse application selection information indicating a scene in a 3D program from the service information, wherein information in the video depth range descriptor is applied for the 3D service during the scene.

2. The apparatus of claim 1, wherein the displaying processor is further configured to control the OSD menu of the apparatus to be displayed on top of the 3D image based on information in the video depth range descriptor.

3. The apparatus of claim 1, wherein the signaling processor is further configured to parse a virtual channel table (VCT) including channel identification information identifying a channel from any other channel within a transport stream (TS), and the video depth range descriptor included in the VCT for identifying the minimum and maximum disparity for the channel identified by the channel identification information.

4. The apparatus of claim 1, wherein the signaling processor is further configured to parse an event information table (EIT) including event identification information identifying an event within a channel, and the video depth range descriptor included in the EIT for identifying the minimum and maximum disparity for the event identified by the event identification information.

5. The apparatus of claim 1, wherein the signaling processor is further configured to parse a scene format type information specifying whether the scene is defined by constant length or is defined by scene start time information and scene duration information.

6. The apparatus of claim 5, wherein the signaling processor is further configured to parse the scene start time information indicating starting time of the scene included in the 3D program for application of the information in the video depth range descriptor from the application selection information.

7. The apparatus of claim 5, wherein the signaling processor is further configured to parse the scene duration information indicating duration of the scene included in the 3D program for application of the information in the video depth range descriptor from the application selection information.

8. The apparatus of claim 7, wherein the displaying processor is further configured to the OSD menu of the apparatus to be displayed on top of the 3D image during the duration of the scene included in the 3D service based on information in the video depth range descriptor and the scene duration information.

9. The apparatus of claim 5, wherein the signaling processor is further configured to parse number information specifying a number of scenes in the 3D program and scene identification information identifying each scene of the scenes.

* * * * *